United States Patent
Weir et al.

(10) Patent No.: US 9,371,708 B2
(45) Date of Patent: Jun. 21, 2016

(54) CIRCULATION SUB AND METHOD FOR USING SAME

(75) Inventors: James William Weir, Houston, TX (US); Andrew Shelton, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 640 days.

(21) Appl. No.: 13/809,151

(22) PCT Filed: Jul. 7, 2011

(86) PCT No.: PCT/US2011/043240
§ 371 (c)(1),
(2), (4) Date: Jan. 8, 2013

(87) PCT Pub. No.: WO2012/006457
PCT Pub. Date: Jan. 12, 2012

(65) Prior Publication Data
US 2013/0112428 A1    May 9, 2013

Related U.S. Application Data

(60) Provisional application No. 61/362,890, filed on Jul. 9, 2010.

(51) Int. Cl.
*E21B 21/10*    (2006.01)
*E21B 33/068*    (2006.01)
(Continued)

(52) U.S. Cl.
CPC ............... *E21B 21/10* (2013.01); *E21B 21/103* (2013.01); *E21B 21/106* (2013.01);
(Continued)

(58) Field of Classification Search
CPC .............................. E21B 21/103; E21B 21/106
See application file for complete search history.

(56) References Cited

U.S. PATENT DOCUMENTS

| | | | | |
|---|---|---|---|---|
| 1,491,986 A | * | 4/1924 | Greene | E21B 17/04 |
| | | | | 137/605 |
| 3,298,385 A | * | 1/1967 | Jackson | E21B 21/106 |
| | | | | 137/112 |

(Continued)

FOREIGN PATENT DOCUMENTS

| | | |
|---|---|---|
| EP | 2088279 | 8/2009 |
| WO | 2005019596 A1 | 3/2005 |

(Continued)

OTHER PUBLICATIONS

Examination Report for European Patent Applicaiton No. 11732553.0 dated Jul. 3, 3014, 4 pages.

(Continued)

*Primary Examiner* — Jennifer H Gay
*Assistant Examiner* — George Gray
(74) *Attorney, Agent, or Firm* — JL Salazar Law Firm

(57) ABSTRACT

Techniques for continuously circulating fluid into a drill string are disclosed. These techniques involve a circulation sub (108) including a tubular and a diverter valve (200A). The tubular has a first end connectable to the drill string, a second end connectable to a pipe segment, and a port (220) therein. The tubular has a fluid path (202) for allowing the fluid to flow from the pipe segment to the drill string and a circulation path (204) for allowing the fluid to flow from the port to the drill string. The diverter valve has a channel therethrough in selective fluid communication with the fluid path. The diverter valve is positionable between a flow through position for selectively allowing the fluid to flow through the fluid path and a diversion position for selectively allowing the fluid to flow through the circulation path whereby the fluid may continuously flow through the drill string.

30 Claims, 25 Drawing Sheets

(51) Int. Cl.
  *F16K 11/056*  (2006.01)
  *F16K 11/065*  (2006.01)
  *F16K 11/07*  (2006.01)
  *F16K 11/074*  (2006.01)
  *E21B 34/00*  (2006.01)

(52) U.S. Cl.
  CPC ............ *E21B 33/068* (2013.01); *F16K 11/056* (2013.01); *F16K 11/0655* (2013.01); *F16K 11/074* (2013.01); *F16K 11/0716* (2013.01); *E21B 2034/002* (2013.01); *E21B 2034/007* (2013.01)

(56) References Cited

U.S. PATENT DOCUMENTS

| | | | |
|---|---|---|---|
| 4,263,936 A | | 4/1981 | Brown |
| 4,452,322 A | * | 6/1984 | Jurgens ............ E21B 4/02 175/107 |
| 4,456,063 A | | 6/1984 | Roche |
| 4,537,250 A | | 8/1985 | Troxell, Jr. |
| 4,566,494 A | | 1/1986 | Roche |
| 4,905,775 A | | 3/1990 | Warren et al. |
| 5,217,073 A | | 6/1993 | Bruns |
| 7,571,773 B1 | * | 8/2009 | West ............ E21B 23/04 137/268 |
| 2005/0274525 A1 | | 12/2005 | Stevens et al. |
| 2006/0254822 A1 | * | 11/2006 | Ayling ............ E21B 19/16 175/57 |
| 2010/0252276 A1 | | 10/2010 | Clausen et al. |
| 2010/0270034 A1 | | 10/2010 | Clausen |

FOREIGN PATENT DOCUMENTS

| | | |
|---|---|---|
| WO | 2005049960 | 6/2005 |
| WO | 2005080745 A1 | 9/2005 |
| WO | 2008156369 A1 | 12/2008 |
| WO | 2010046653 | 4/2010 |

OTHER PUBLICATIONS

International Search Report for PCT Application No. PCT/US2011/043240 dated Nov. 24, 2011, 5 pages.

* cited by examiner

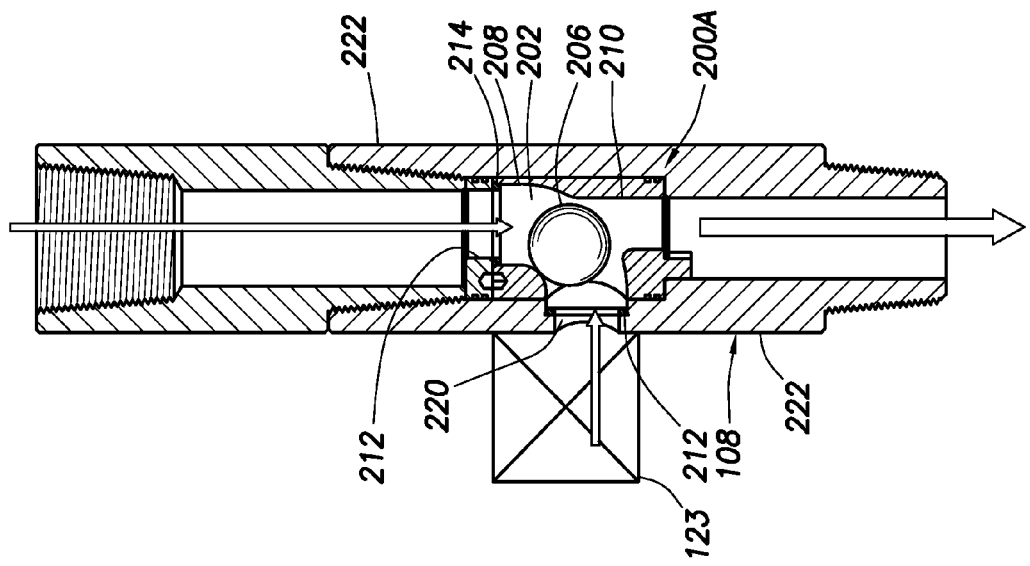
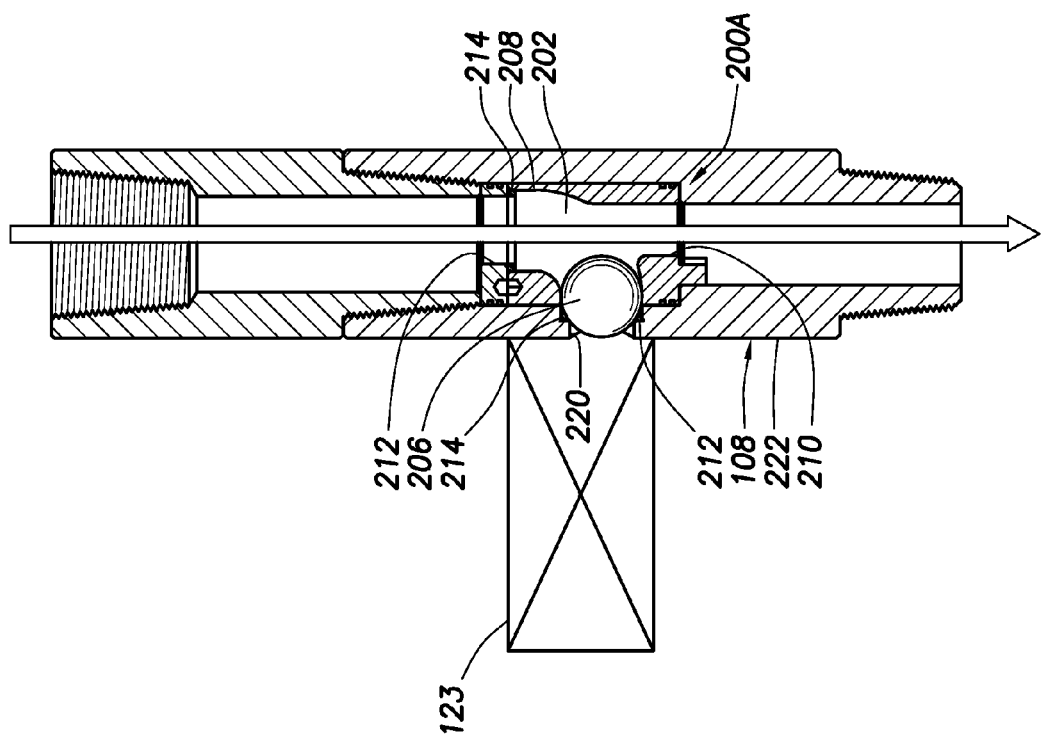

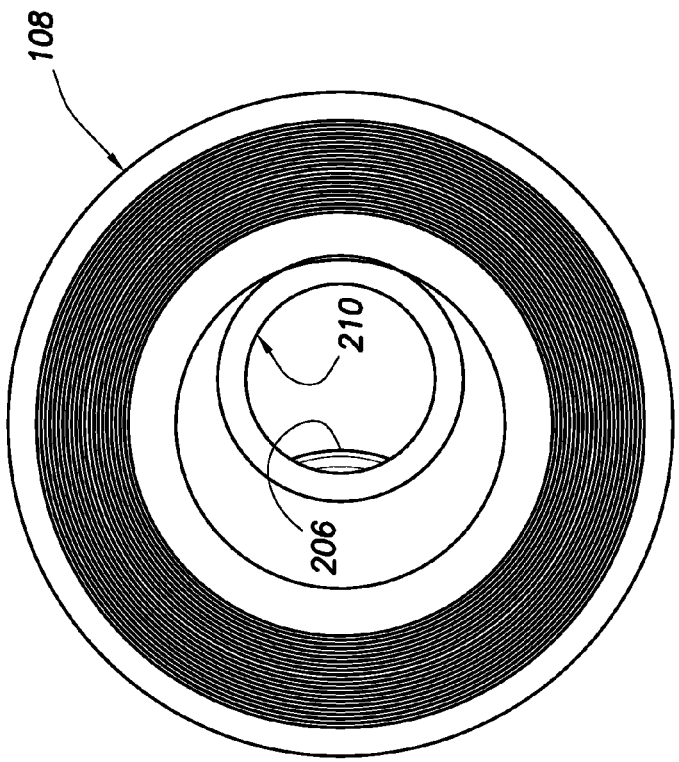
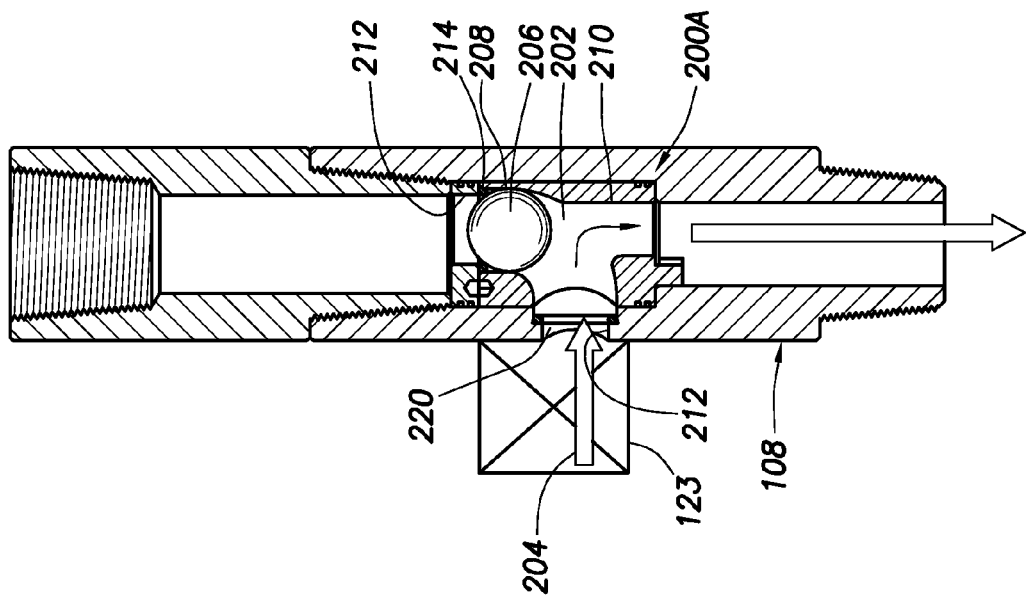

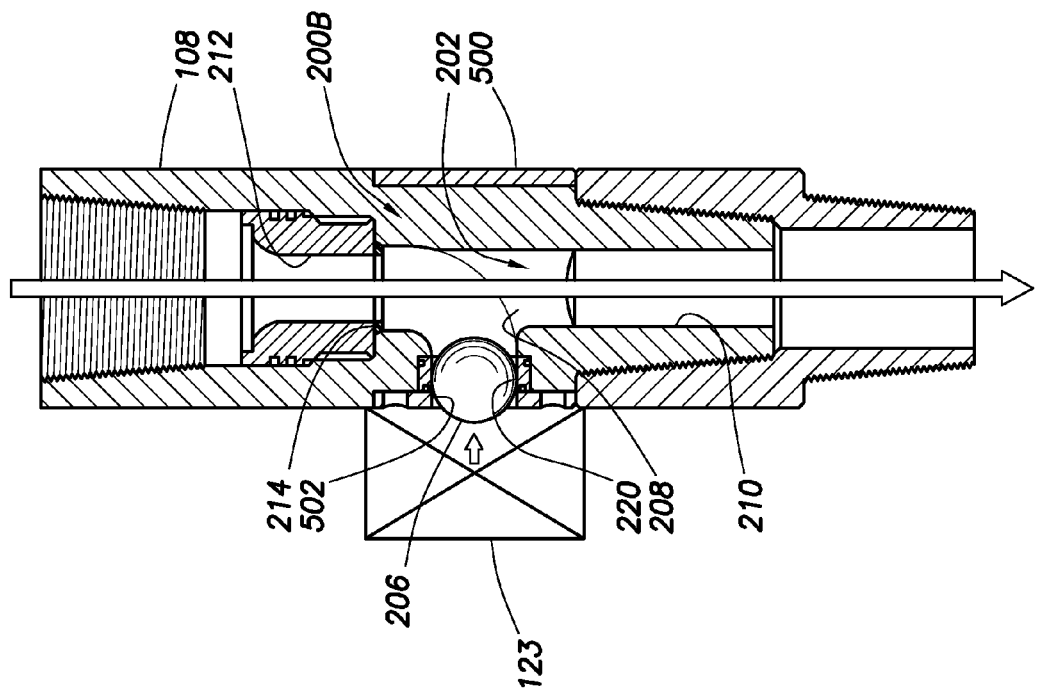
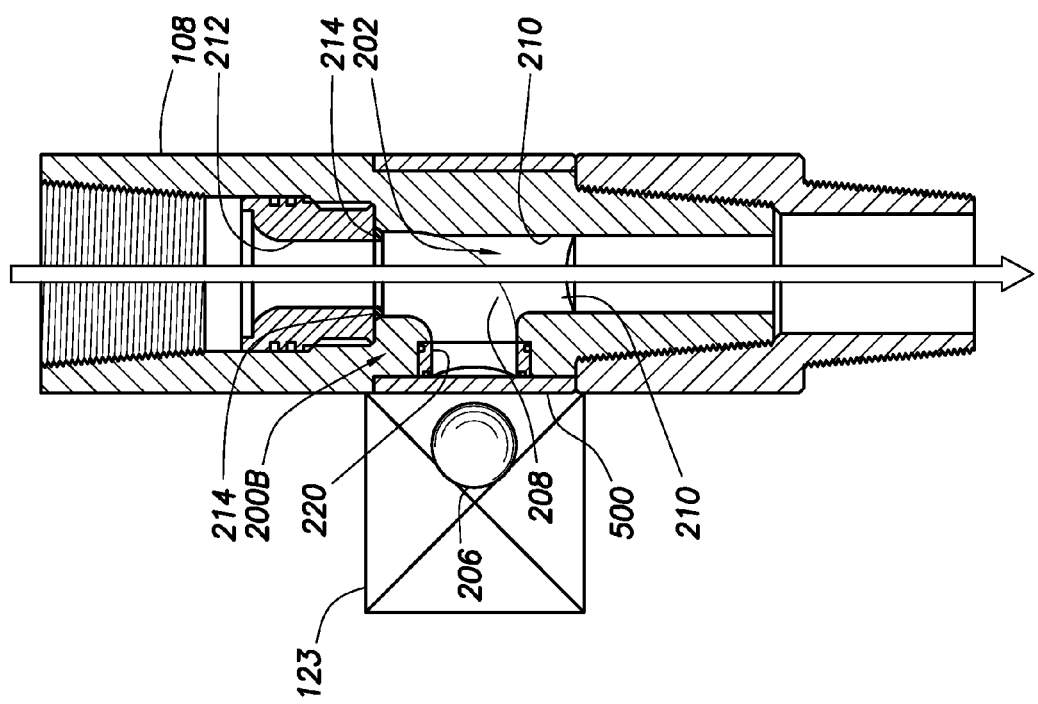

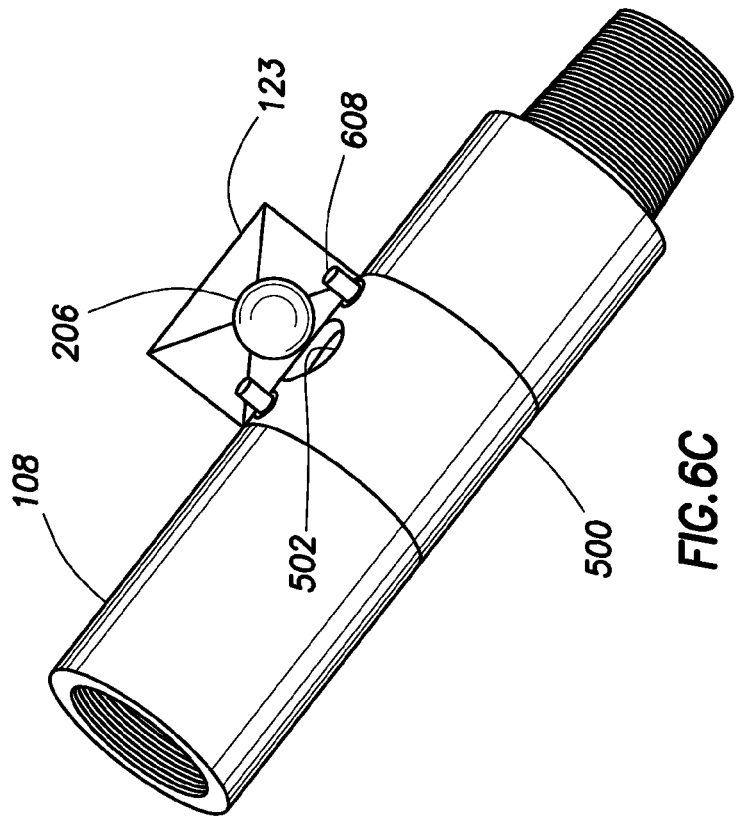
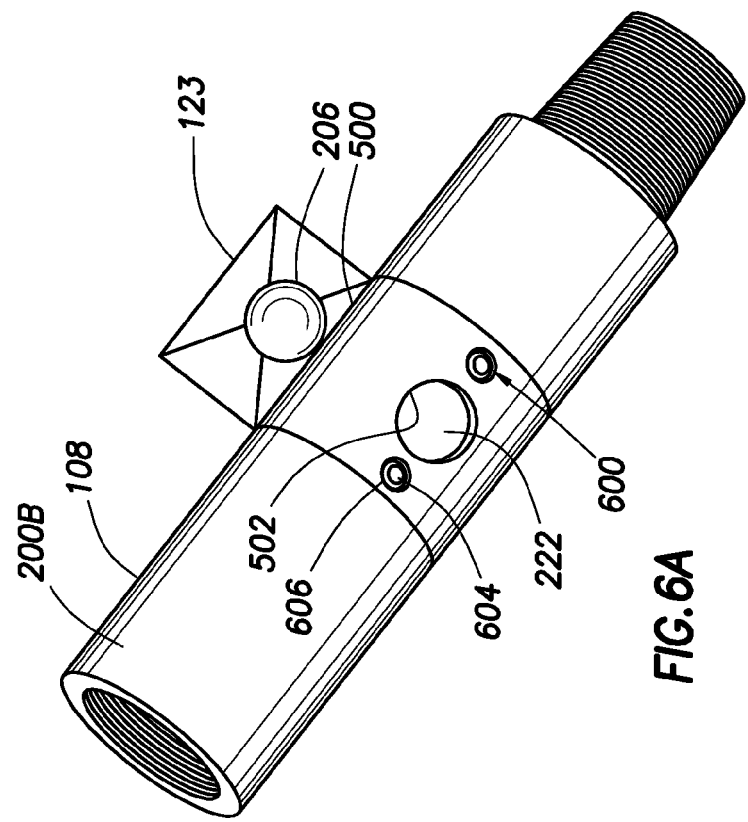

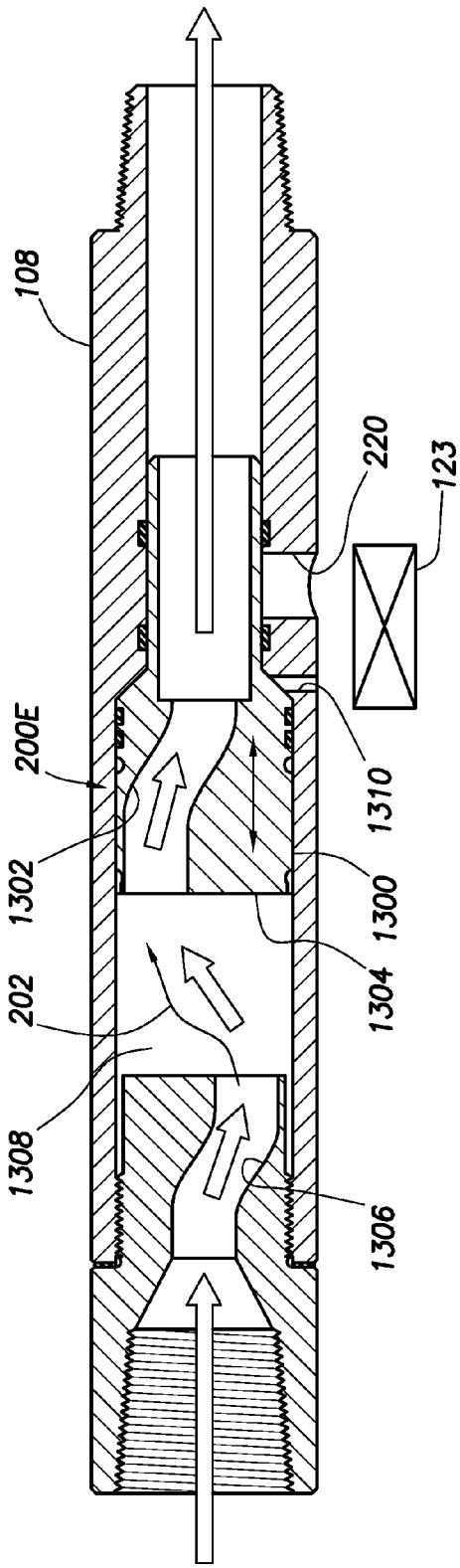
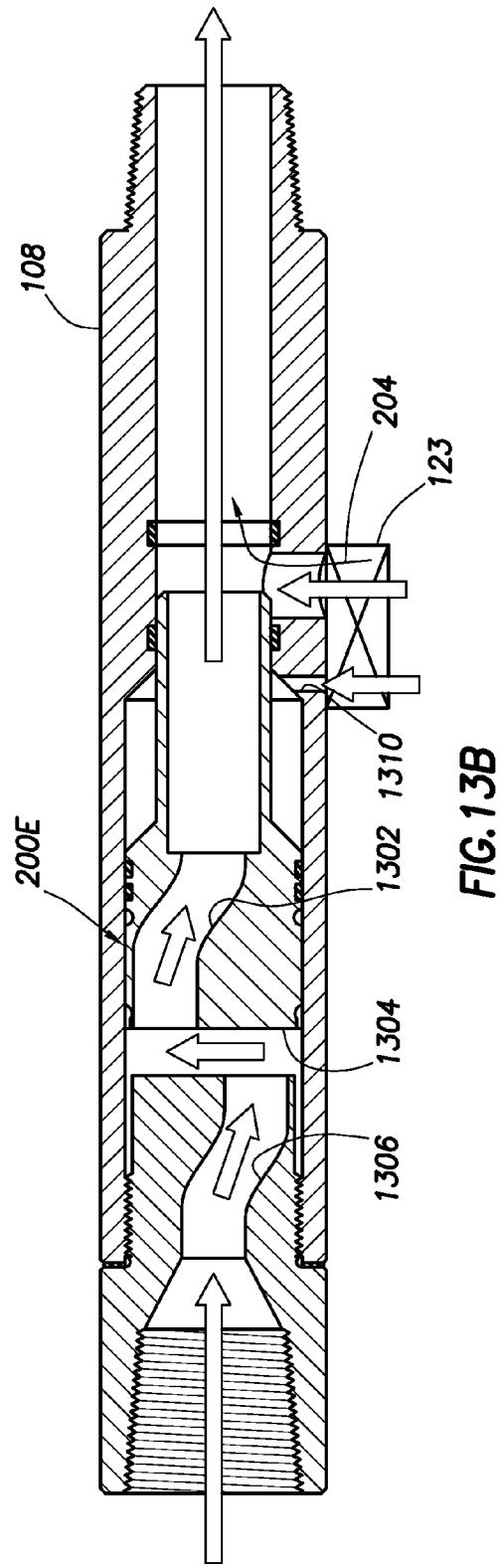
FIG. 13A
FIG. 13B

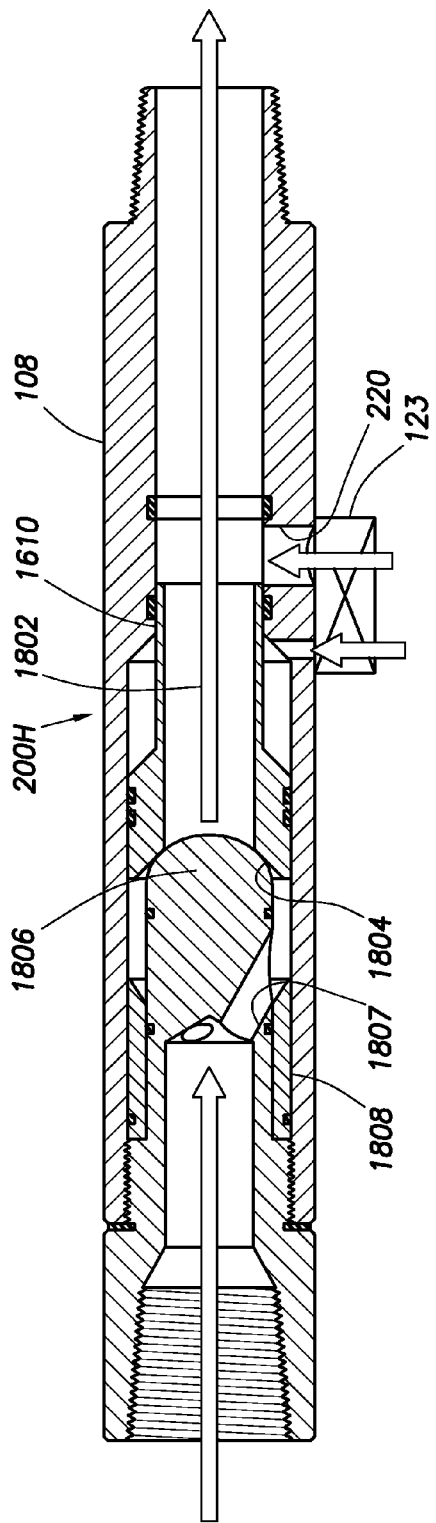
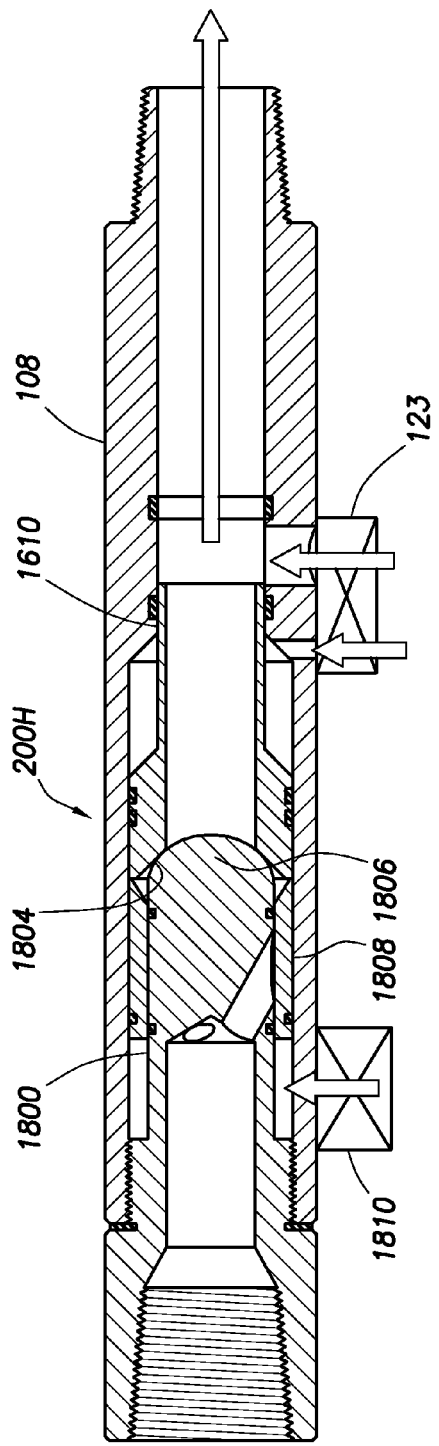
FIG.18B
FIG.18C

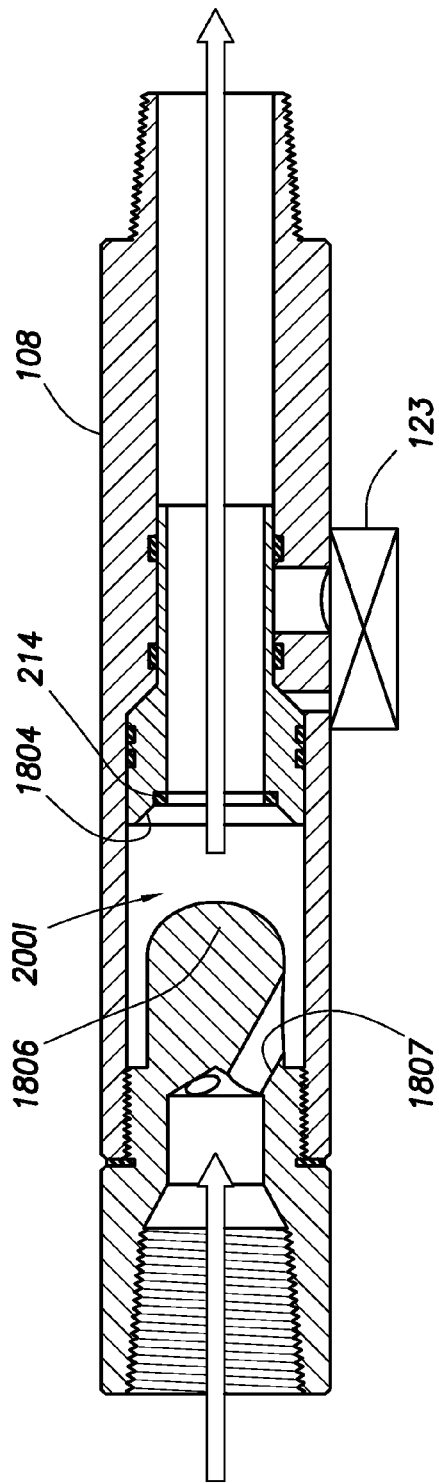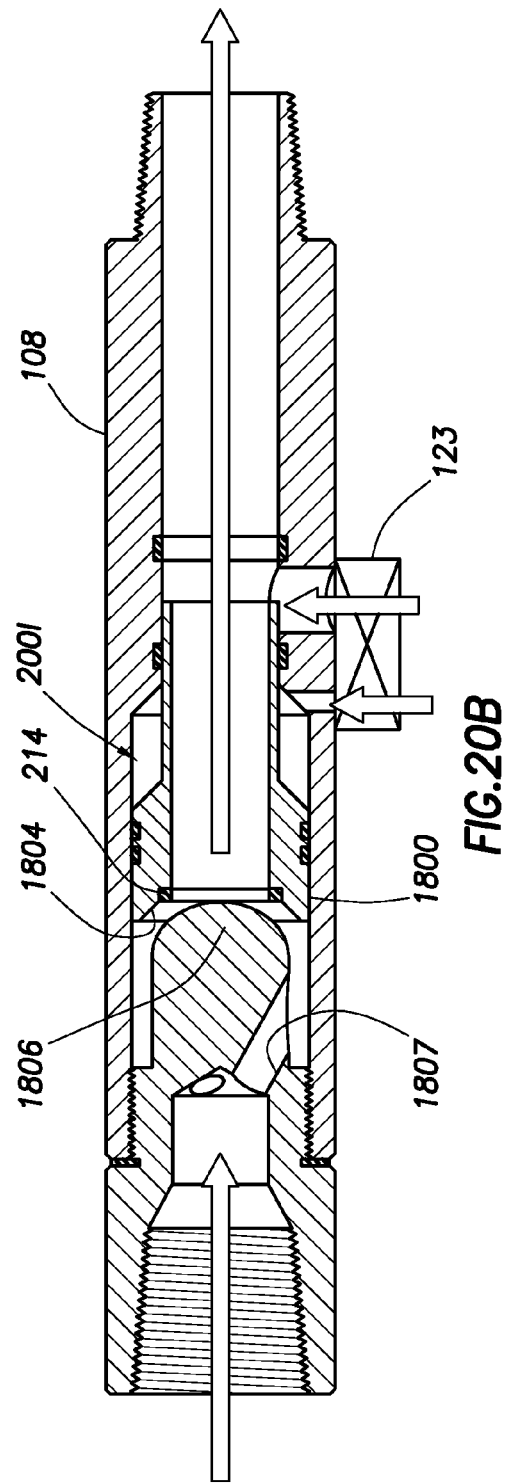
FIG.20A
FIG.20B

CIRCULATION SUB AND METHOD FOR USING SAME

BACKGROUND OF THE INVENTION

1. Field of the Invention

This invention relates generally to techniques for performing wellsite operations. More specifically, the invention relates to techniques for controlling (e.g., circulating) fluid flow-through a drill string.

2. Description of Related Art

Oilfield operations are typically performed to locate and gather valuable downhole fluids. Oil rigs are positioned at wellsites and downhole tools, such as drilling tools, are deployed into the ground on drill strings to reach subsurface reservoirs. During drilling, mud may be pumped into the drill string from a top drive in order to lubricate and/or rotate a drill bit, and control pressure in the drill string. The drill string may be formed of several drill string segments (or pipe segments, drill pipe, pipe joints, casing, landing strings, cross-over subs or other tubulars) coupled together on a rig at the surface. During the connection of the pipe segments, the top drive may be disconnected from the drill string, thereby stopping the flow of drilling mud into the drill string. Once the downhole tools form a wellbore to reach a desired reservoir, casings may be cemented into place within the wellbore, and the wellbore completed to initiate production of fluids from the reservoir. Tubing or pipes are typically positioned in the wellbore to enable the passage of subsurface fluids to the surface.

During drilling, it may be desirable to control fluid pressure of the drill string. For example, the fluid pressure of the drill string may be controlled with fluid flow from a top drive during drilling. In another example, the fluid pressure in an annulus surrounding the drill string may be controlled (e.g., circulated) during the connection operation. Some examples of drilling mud pressure control techniques are provided in U.S. Pat. No. 7,726,418, 2009/0205838, International Patent Application No. WO2009/067588 (US20100270034) and WO2009/067485 (US20100252276). However, in some cases, fluid pressure may not be controlled during drilling operations. For example, the drilling mud may be pumped into the drill string during drilling, but may be left uncontrolled during the connection of the pipe segments.

Despite the development of techniques involving drilling mud pressure control, there remains a need to provide advanced techniques for controlling pressure during drilling operations. The invention is directed to fulfilling these needs in the art.

SUMMARY OF THE INVENTION

In at least one aspect, the techniques herein relate to a circulation sub for continuously circulating fluid into a drill string. The drill string is positionable in a wellbore penetrating a subterranean formation. The circulation sub has a tubular having a first end connectable to the drill string and a second end connectable to a pipe segment. The tubular has a port therein. The tubular has a fluid path for allowing the fluid to flow from the pipe segment to the drill string and a circulation path for allowing the fluid to flow from the port to the drill string. The circulation sub also has a diverter valve having a channel therethrough in selective fluid communication with the fluid path. The diverter valve is positionable between a flow through position for selectively allowing the fluid to flow through the fluid path and a diversion position for selectively allowing the fluid to flow through the circulation path whereby the fluid may continuously flow through the drill string.

The diverter valve may have a ball valve selectively positionable in the fluid path and the circulation path, a port sleeve for selectively sealing off the port, a flow through tube positionable in the tubular. The flow through tube may have the channel therethrough, and the fluid path and the circulation path therethrough. At least a portion of the flow through tube may have a circular cross section or a slotted cross section. The flow through tube may also have a sleeve rotationally positionable about the tubular for selectively blocking the port and/or a sleeve lock.

The diverter valve may have a gate valve having a gate flow port therethrough and a gate actuation surface thereon. The gate valve may be positionable about the fluid path and the circulation path for selectively allowing fluid flow therethrough. The diverter valve may have a drum rotationally positionable in the tubular for selectively positioning the channel in fluid communication with the fluid path and the circulation path.

The diverter valve may have a piston slidably movable in the tubular, the piston having a port end for selectively blocking the circulation path and a flow end for selectively blocking the fluid path. The tubular may have a hydraulic port for selectively allowing the fluid to flow therein to move the piston. The tubular may have fingers for rotationally engaging a slot in the piston for selective positioning thereof. The diverter valve may also have a piston stop with a flow tube therethrough for passage of the fluid from the pipe segment to the channel and/or a sliding sleeve slidably positionable about the piston stop for selectively blocking fluid from flowing from the flow tube to the channel.

The diverter valve may have a plunger piston slidably movable in the tubular, the piston having at least one piston flow path therethrough in fluid communication with the channel. The plunger piston may have a port end for selectively blocking the circulation path and a flow end for selectively blocking the fluid path. The circulation sub may also have at least one gasket.

In another aspect, the techniques herein may relate to a circulation system for continuously circulating fluid into a drill string. The drill string is positionable in a wellbore penetrating a subterranean formation. The circulation system may include a circulation sub that includes a tubular having a first end connectable to the drill string, a second end connectable to a pipe segment, and a port therein. The tubular may have a fluid path for allowing the fluid to flow from the pipe segment to the drill string and a circulation path for allowing the fluid to flow from the port to the drill string. The circulation system may also have a diverter valve having a channel therethrough in selective fluid communication with the fluid path, the diverter valve positionable between a flow through position for selectively allowing the fluid to flow through the fluid path and a diversion position for selectively allowing the fluid to flow through the circulation path whereby the fluid may continuously flow through the drill string. The system may also include a surface system for coupling the circulation sub to the drill string and for coupling a drill pipe segment to the circulation sub, and a fluid source for allowing the fluid to flow through the circulation sub.

The circulation system may also have an actuator for selectively positioning the diverter valve. The fluid source may be in selective fluid communication with the first end of the tubular and the port for selectively allowing the fluid to flow therein.

Finally, in another aspect, the techniques herein may relate to a method for continuously circulating fluid into a drill string. The method may involve providing a circulation sub.

The circulation sub may include a tubular having a first end connectable to the drill string and a second end connectable to a pipe segment, the tubular having a port therein. The tubular has a fluid path for allowing the fluid to flow from the pipe segment to the drill string and a circulation path for allowing the fluid to flow from the port to the drill string. The circulation sub may also have a diverter valve having a channel therethrough in selective fluid communication with the fluid path, the diverter valve positionable between a flow through position for selectively allowing the fluid to flow through the fluid path and a diversion position for selectively allowing the fluid to flow through the circulation path. The method may further involve connecting a first end of the tubular to the drill string and connecting a pipe segment to the second end of the tubular while continuously flowing of the fluid through the circulation sub and into the drill string.

The method may also involve selectively diverting the circulation sub between the flow through position and the circulation position, and selectively allowing the fluid to flow into the first end of the tubular and into the port.

BRIEF DESCRIPTION DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are, therefore, not to be considered limiting of its scope. The figures are not necessarily to scale and certain features and certain views of the figures may be shown exaggerated in scale or in schematic in the interest of clarity and conciseness.

FIGS. 2A-2C are schematic, cross-sectional views depicting the operation of the circulation sub of FIG. 1 having a ball valve for selectively controlling fluid flow.

FIG. 3 shows a top view of the circulation sub of FIG. 2A.

FIGS. 5A-5D are schematic, cross-sectional views depicting the circulation sub having a removable ball valve for selectively controlling fluid flow.

FIGS. 6A-6C depict various schematic views of the circulation sub of FIG. 5A having the removable ball valve.

FIGS. 13A-13C are schematic, cross-sectional views depicting the circulation sub having a full bore valve for selectively controlling fluid flow.

FIGS. 18A-18C are schematic, cross-sectional views of the circulation sub having of a central bore plunger valve for selectively controlling fluid flow.

FIGS. 20A-20C are schematic, cross-sectional views of the circulation sub having of a modified central bore plunger valve for selectively controlling fluid flow.

DETAILED DESCRIPTION OF THE INVENTION

The description that follows includes exemplary apparatus, methods, techniques, and instruction sequences that embody techniques of the present inventive subject matter. However, it is understood that the described embodiments may be practiced without these specific details.

During drilling, fluid flow may be interrupted during drilling operations, such as during connection of tubulars to a drill string. Techniques for continuously circulating fluid and/or controlling pressure during drilling operations may be provided, for example, by using fluid flow within the drill string during drilling and/or connection processes. Such fluid pressure may be controlled continuously within the drill string, even during ongoing drilling operations, such as during the connection of tubulars. Such techniques may involve one or more of the following, among others: reduced down time, efficient operation, effective pressure and/or flow control, operability with existing equipment, easy assembly & maintenance, enhanced flow path, reduced equipment failure, locking capabilities, etc.

Figure 1:
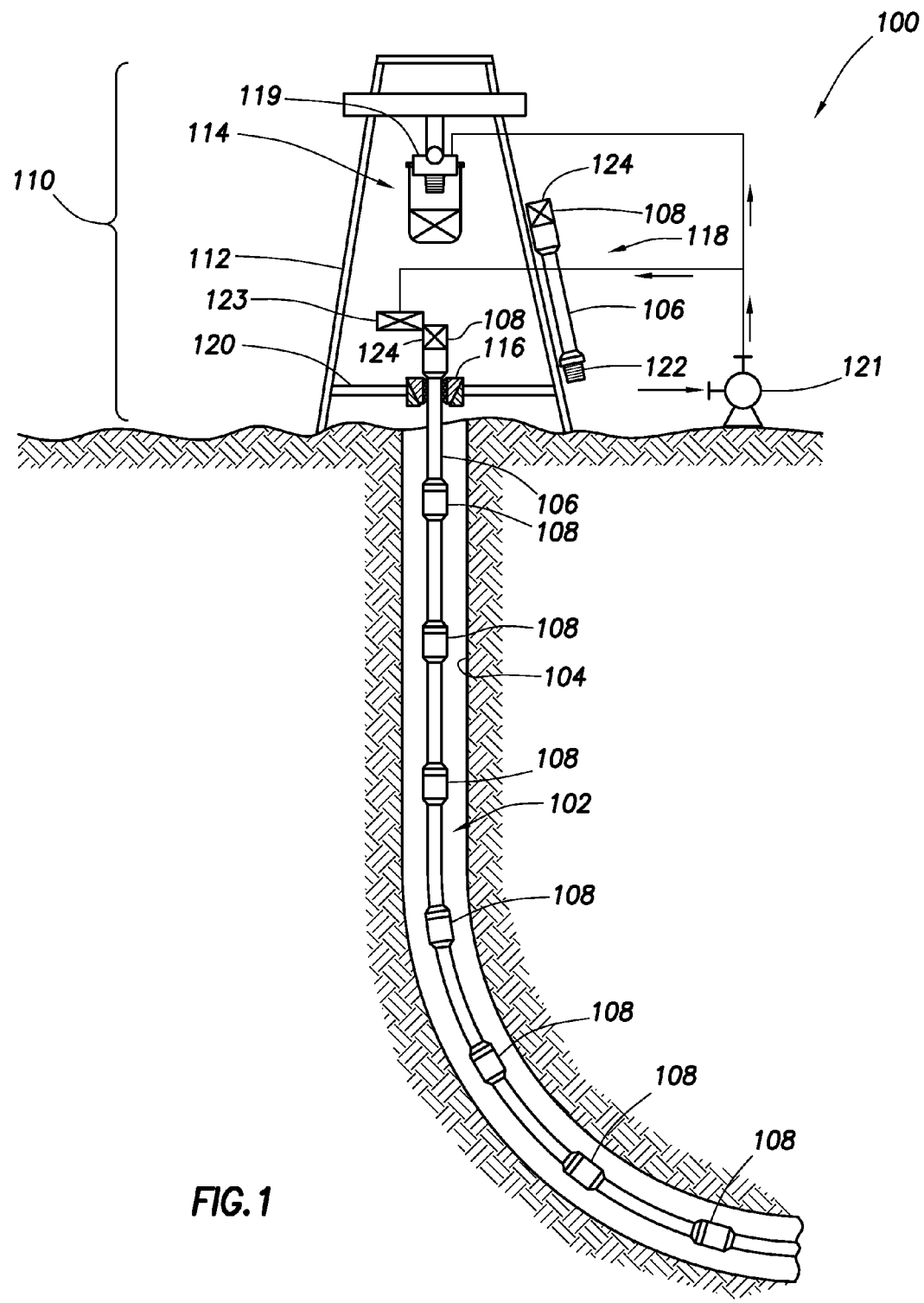
FIG. 1 shows a schematic view of a wellsite having a drill string suspended from an oil rig for advancing a drilling tool into the Earth to form a wellbore, the drill string having a plurality of drill pipe segments and circulation subs joined together by tubular threaded connections.

FIG. 1 depicts a schematic view of a wellsite 100 for running a drill string 102 into a wellbore 104. The drill string 102 may include a plurality of drill pipe segments 106 (or drill pipe, pipe joints, casing, landing strings, cross-over subs or other tubulars) coupled together. The drill string 102 may have at least one circulation sub 108 for selectively controlling the flow of fluid into the drill string 102. The circulation sub 108 may be coupled between each (or some) of the drill pipe segments 106 in the drill string 102. The circulation sub 108 may be coupled to the drill pipe segments 106 prior to locating the drill pipe segments 106 in a pipe stand 118 at a rig 112.

A surface system 110 may couple and convey the plurality of drill pipe segments 106 into the wellbore 104. The surface system 110 may comprise the rig 112, a hoisting system 114, a set of slips 116 and the pipe stand 118. The hoisting system 114 may have a top drive 119 for rotating the drill sting 102 and/or pumping drilling mud into the drill string 102. The set of slips 116 may support the drill string 102 from a rig floor 120 while the hoisting system 114 engages the next drill pipe segment 106 from the pipe stand 118.

The hoisting system 114 may then locate a pin end 122 of the suspended drill pipe segment 106 over a box end 124 (or box) of the circulation sub 108 coupled to an uppermost drill pipe (or tubular) of the drill string 102 held by the slips 116. The pin end 122 of the suspended drill pipe segment 106 may then be located in the box end 124 of the circulation sub 108 in the drill string 102. Torque may then be applied to the suspended drill pipe segment 106 in order to couple the pin end 122 to the box end 124.

The drill string 102 may be made up of varying types of drill pipe segments 106. For example, the drill string 102 may be a combination of tubulars, such as drill pipe, pipe joints, casing, landing strings, cross-over subs, and the like. The circulation sub 108 may be installed into the drill string 102 in a similar manner as the drill pipe segments 106, described above.

The circulation sub 108 may allow for the continuous, or substantially continuous, flow of fluids, such as drilling mud into the drill string 102. When the top drive 119 is coupled to the drill string 102 via the uppermost circulation sub 108 fluid may be pumped into the drill string through the top drive 119 using a pump system 121. Prior to disengaging the top drive 119 from the uppermost circulation sub 108, in order to get the next drill pipe segment 106, a circulation actuator 123 may engage the circulation sub 108.

The circulation actuator 123 may fluidly couple the circulation sub 108 to the pump system 121 while restricting flow through the entire length of the circulation sub 108, as will be described in more detail below. Therefore, when the circulation actuator 123 is connected to the circulation sub 108 fluid may be pumped into the drill string 102 independent of the top drive 119. The pressure provided by the circulation actuator 123 may be equalized with the pressure from the top drive 119 prior to fluidly coupling the circulation sub 108 with the circulation actuator 123. The top drive 119 may then be disconnected from the drill string 102 in order to obtain the next drill pipe segment 106. Although the pump system 121 is described as being a single pump for pumping fluids into the top drive 119 and/or the circulation actuator 123, it may be multiple pumps and flow lines.

FIGS. 2A-2C are schematic views depicting the operation of the circulation sub 108 of FIG. 1. FIGS. 2A-2C are longitudinal, cross-sectional views of the circulation sub 108 supported by top drive 119 and with the circulation actuator 123 connected thereto. The circulation sub 108 has a ball valve 200A therein for selectively controlling fluid flow. FIGS. 2A-2C depicts the ball valve 200A in various positions for selectively controlling the flow of fluid through the sub 108.

FIG. 2A shows the ball valve 200A in a flow through position. In the flow through position a flow through path 202 is open thereby allowing the top drive 119 to pump fluids through the circulation sub 108. FIG. 2B shows the ball valve 200A in an intermediate position between the flow through position and a circulation position. FIG. 2C shows the ball valve 200A in the circulation position. In the circulation position the flow through path 202 is closed and a circulation path 204 is opened. The circulation path 204 may allow the circulation actuator 123 to flow fluids into the drill string 102 (as shown in FIG. 1) via the circulation sub 108.

The ball valve 200A may comprise a ball 206 configured to travel on a curved path 208 between the flow through position and the circulation position. A flow through tube 210 may be sized to allow fluid to pass therethrough while preventing the ball 206 from entering the flow through tube 210. The curved path 208 may have a neck 212 located at each end of the curved path 208. The neck 212 may be sized to prevent the ball 206 from moving past the neck 212. The neck 212 may have a ball seal 214 for sealing the ball 206 against the neck 212 in the flow through position and/or the circulation position.

The circulation actuator 123 for actuating the ball valve 200A may be an actuator flow tube 123 that connects to an access port 220 on an outer surface 222 of the circulation sub 108 (as shown in FIGS. 2A-2C). Examples of a tool having side entry ports are described in International Patent Nos. WO2009/067588 (US20100270034) and WO2009/067485 (US20100252276).

The actuator flow tube 123 may fluidly connect the pump system 121 (as shown in FIG. 1) with a portion of the curved path 208. Once in fluid communication with the curved path, the pump system 121 may flow fluid through the port 220 and into the curved path 208. The fluid flowing into the port 220 may push the ball 206 from the flow through position to the circulation position.

FIG. 3 shows a top view of the circulation sub 108 of FIG. 2A with the ball 206 located in the flow through position. With the ball 206 in the flow through position, the flow through tube 210 is open for flow from the top drive 119 through the circulation sub 108 and into the drill string 102 (as shown in FIG. 1).

Figure 4A:
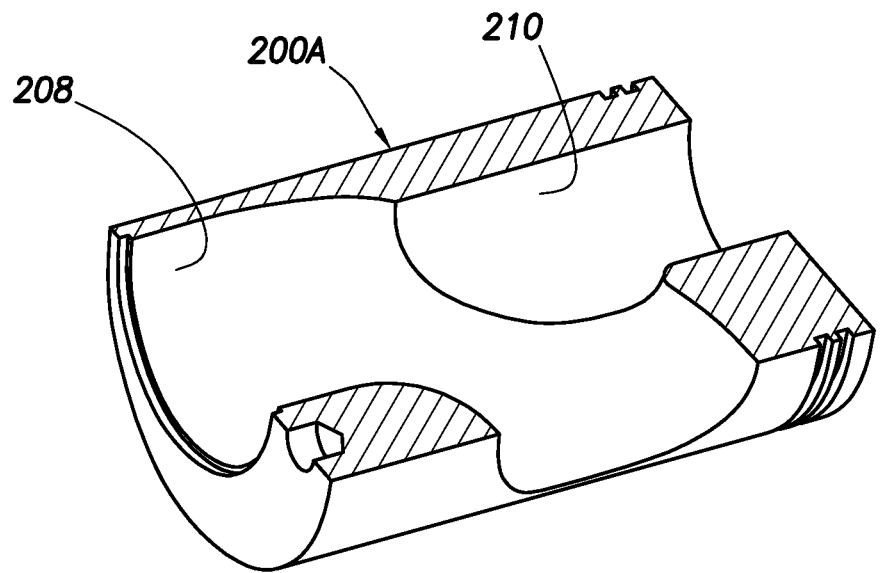
FIGS. 4A and 4B show perspective, cross-sectional views of the ball valve of FIG. 2A having a round and oval flow through tube, respectively.
Figure 4B:
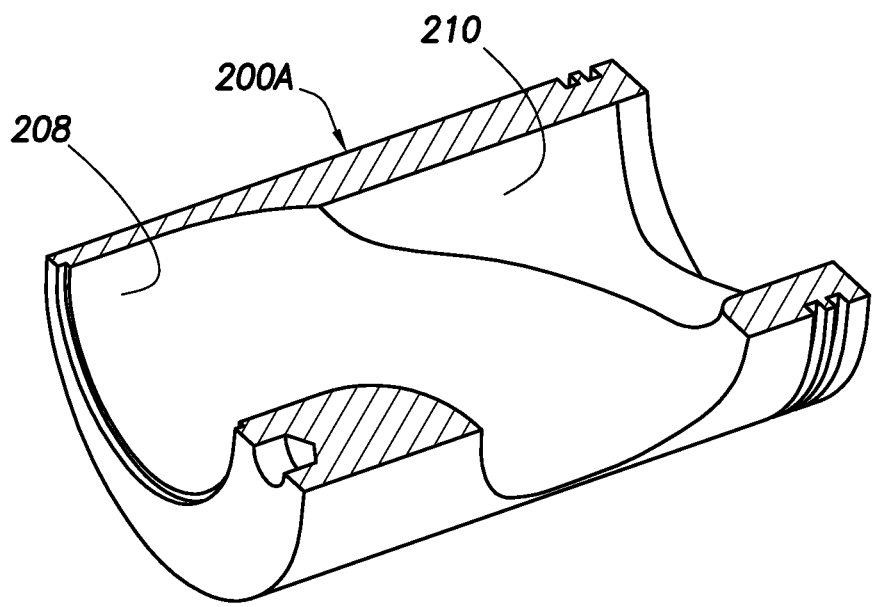

FIGS. 4A and 4B show a perspective, cross-sectional view of the flow through tube 210 of the ball valve 200A of FIGS. 2A-2B. FIG. 4A depicts the flow through tube 210 having a circular cross section with a diameter that is less than the diameter of the curved path 208. Therefore, the ball 206 (as shown in FIGS. 2A-2C and 3) may ride along the curved path 208 between the flow through position and the circulation position while riding over the flow though tube 210. The curved path 208, or ball track, may be non-load bearing and may be cast, then machined.

The flow through tube 210 may be round or have varying shapes such as oval in order to manipulate (e.g., maximize) flow. FIG. 4B depicts an alternative flow through tube 210 having a slotted cross section, or oval shape. The slotted cross section may be sized to allow the ball 206 (as shown in FIG. 2A-2C) to ride over the slotted cross section as the ball 206 moves between the flow through position and the circulation position.

FIGS. 5A-5D depicts the operation of the circulation sub 108 of FIG. 1 wherein the circulation sub 108 has a removable ball valve 200B for selectively controlling fluid flow. The ball 206, the curved path 208, the flow through path 210, the neck 212 and the seal 214 shown in FIGS. 5A-5D may be similar to the parts of the ball valve 200A (as shown in FIGS. 2A-2C). FIGS. 5A-5D depicts the ball valve 200B in various positions for selectively controlling the flow of fluid through the sub 108. FIGS. 5A-5D also depicts insertion and movement of the ball 206 during operation.

FIG. 5A shows the removable ball valve 200B in a flow through position. In the flow through position the flow through path 202 is open thereby allowing the top drive 119 to pump fluids through the circulation sub 108. In the flow through position, the ball 206 has been removed from the removable ball valve 200B and a sleeve 500 seals off the port 220 in the circulation sub 108. The sleeve 500 may be a sliding sleeve that is actuated by the circulation actuator 123.

FIG. 5B shows the removable ball valve 200B in a ball entry position. In the ball entry position, the sleeve 500 may have been rotated to align a sleeve aperture 502 with the port 220 and the circulation actuator 123 may have moved the ball 206 into the port 220 through the sleeve aperture 502. The circulation actuator 123 may continue to apply fluid pressure into the curved path 208 thereby moving the ball 206 along the curved path 208 to the intermediate position as shown in FIG. 5C. The intermediate position for the removable ball valve 200B may be similar to the intermediate position for the ball valve 200A (as shown in FIGS. 2A-2C).

Figure 5D:
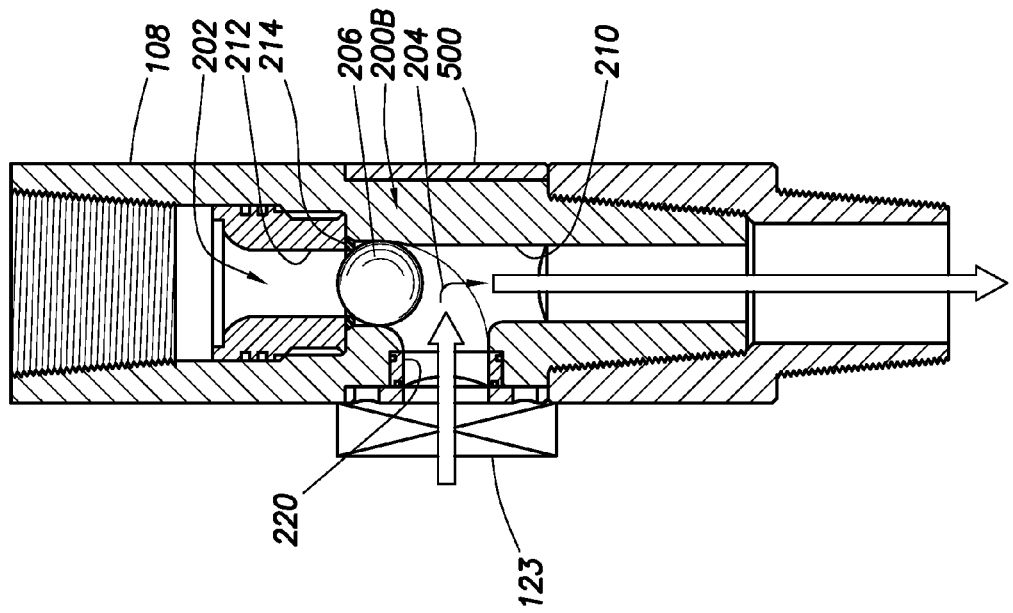
Figure 5C:
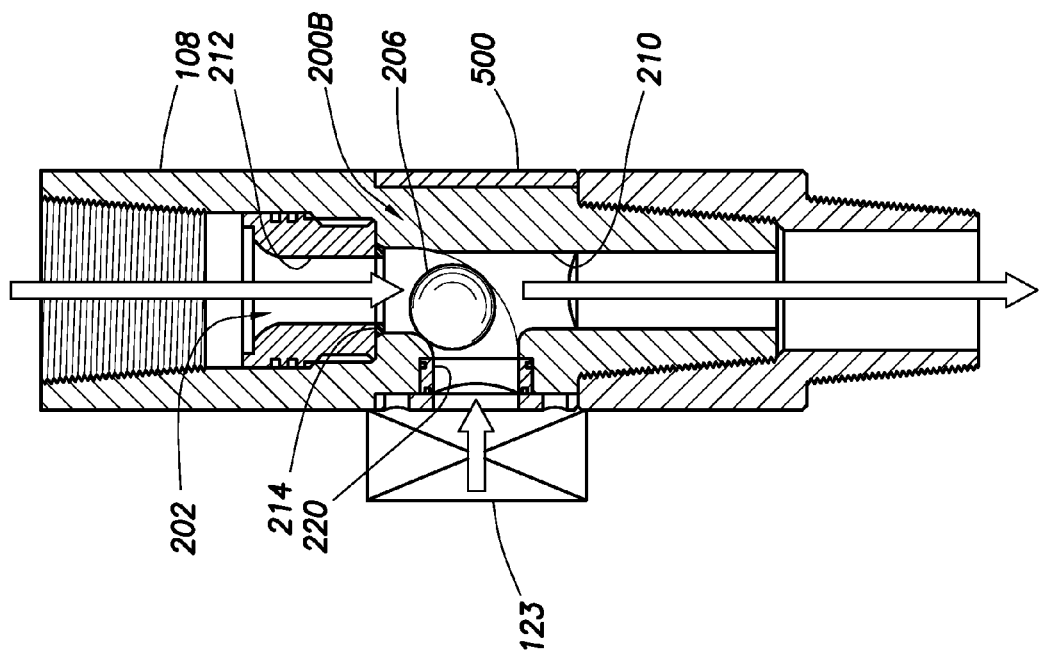

FIG. 5D shows the removable ball valve 200B in the circulation position. In the circulation position the flow through path 202 is closed and the circulation path 204 is opened. The circulation path 204 may allow the circulation actuator 123 to flow fluids into the drill string 102 (as shown in FIG. 1) via the circulation sub 108. The ball 206 may selectively be returned back to its original position and/or moved between the positions of FIG. 5A-5D.

Figure 6B:
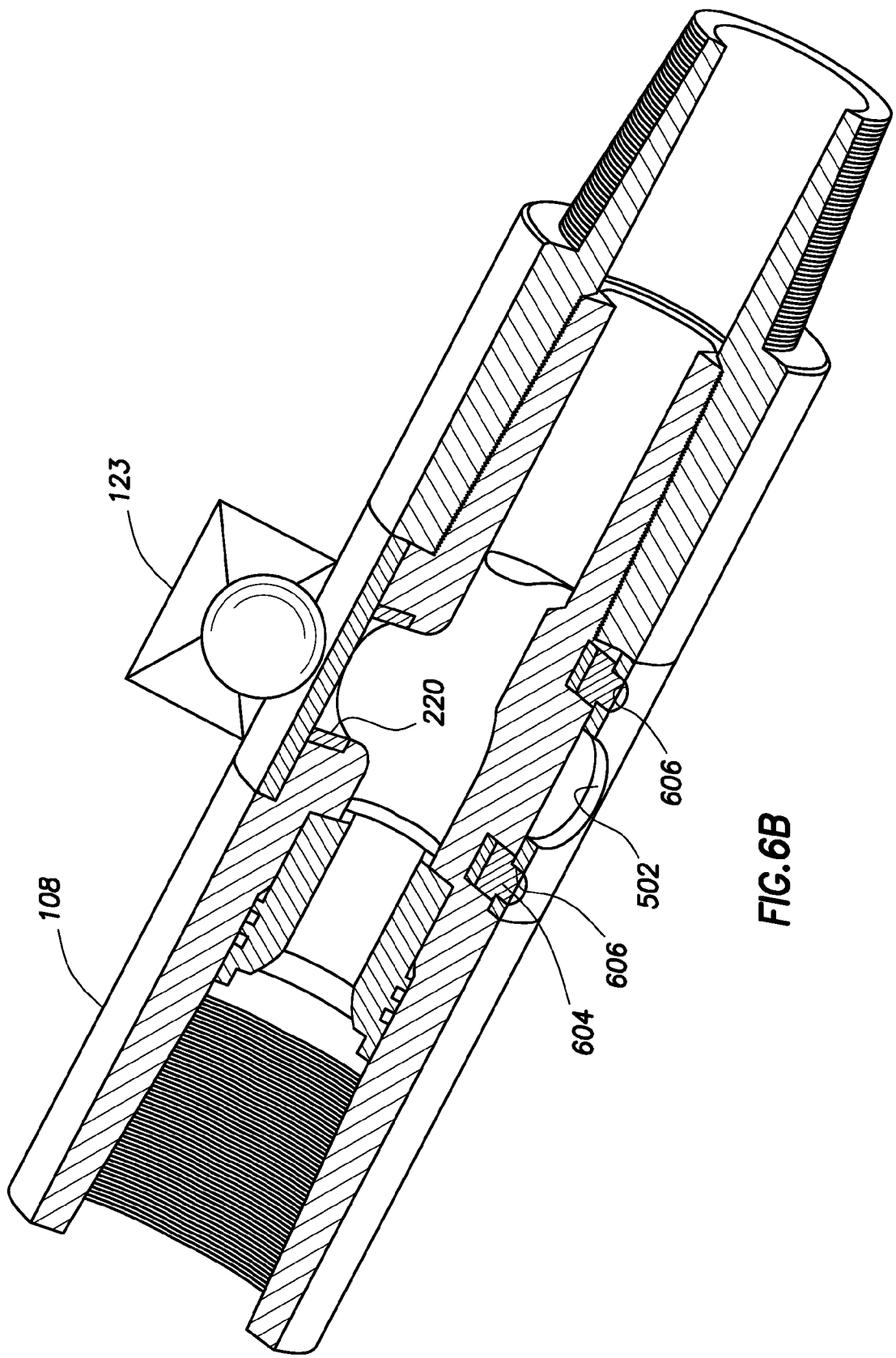

FIGS. 6A-6C depicts various views of a circulation sub 108 with the removable ball valve 200B positionable thereabout to selectively allow entry of the ball 206 into the circulation sub 108. FIG. 6A depicts a schematic view of the circulation sub 108 having the removable ball valve 200B. FIG. 6B depicts a partial cut away schematic view of the circulation sub 108 having the removable ball valve 200B. The sleeve 500 is shown in the closed position thereby aligning the sleeve aperture 502 with the outer surface 222 of the circulation sub 108. In the closed position, the sleeve 500 seals the port 220 as shown in FIG. 6B.

The sleeve 500 may have a sleeve lock 600 configured to maintain the sleeve 500 in the closed position. As shown, the sleeve lock 600 may be one or more locking pins 604, or detent locking pins, configured to engage a lock port 606 in the sleeve 500 when the sleeve is locked in the closed position. The one or more locking pins 604 may be biased toward the locked position.

FIG. 6C depicts a schematic view of the circulation sub 108 having the removable ball valve 200B wherein the sleeve 500 is in the ball entry position. The circulation actuator 123 may have one or more unlocking devices 608. The unlocking devices 608 may engage the one or more locking pins 604 and move them to a depressed position that allows the sleeve 500 to rotate about the circulation sub 108. Maintaining the one or more locking pins 604 in the depressed position may allow the circulation actuator 123 to rotate the sleeve 500 in order to align the sleeve aperture 502 with the port 220 as shown in FIG. 6B. The circulation actuator 123 may then move the ball 206 into the ball entry position.

The circulation actuator 123 may flow the same ball 206 into and out of multiple circulation subs 108 as the drill string 102 (as shown in FIG. 1) is run into the wellbore 104. Further, the circulation actuator 123 may have multiple balls 206 that are used of each, or a finite number, of the circulation subs 108. When using multiple balls 206, the circulation actuator 123 may include a ball disposal bin (not shown) for placing the used balls in after removal.

Figure 7:
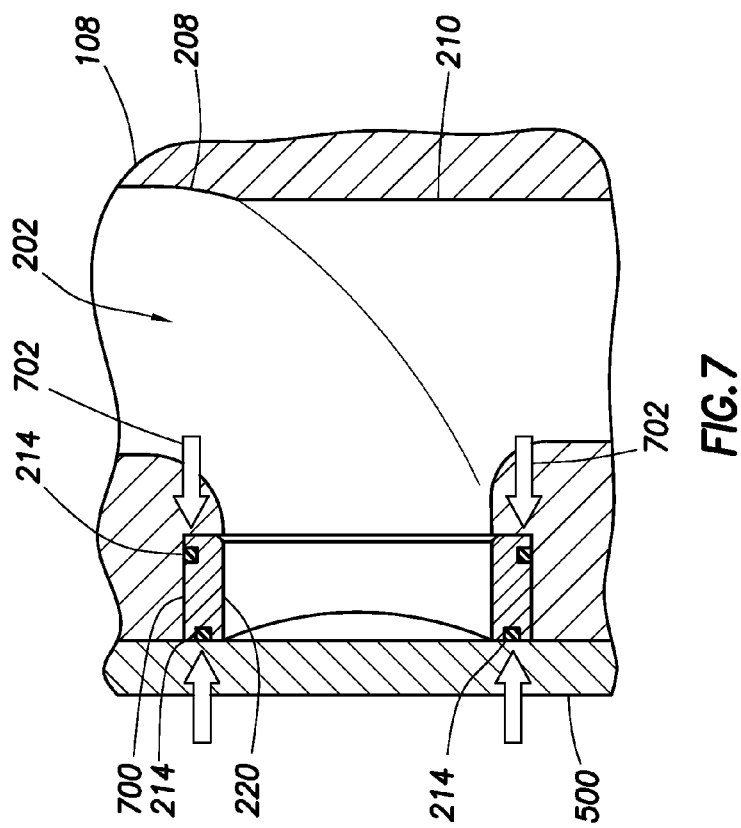
FIG. 7 depicts a cross sectional view of a port of the circulation sub of FIG. 5A.

FIG. 7 depicts a cross sectional view of the port 220 of the circulation sub 108 as shown in FIGS. 5A-5D. The port 220 may have a port seal 700 for sealing the circulation sub 108 between the sleeve 500 and the flow through path 202. The port seal 700 may have one or more seals 214, or o-rings. The port seal 700 may be motivated toward the sleeve 500 in order to ensure the sealing. The port seal 700 may be motivated out using a hydraulic force 702, a biasing force and the like. Further, differential areas on the port seal 700 may force the port seal 700 out against the sleeve 500.

Figure 8A:
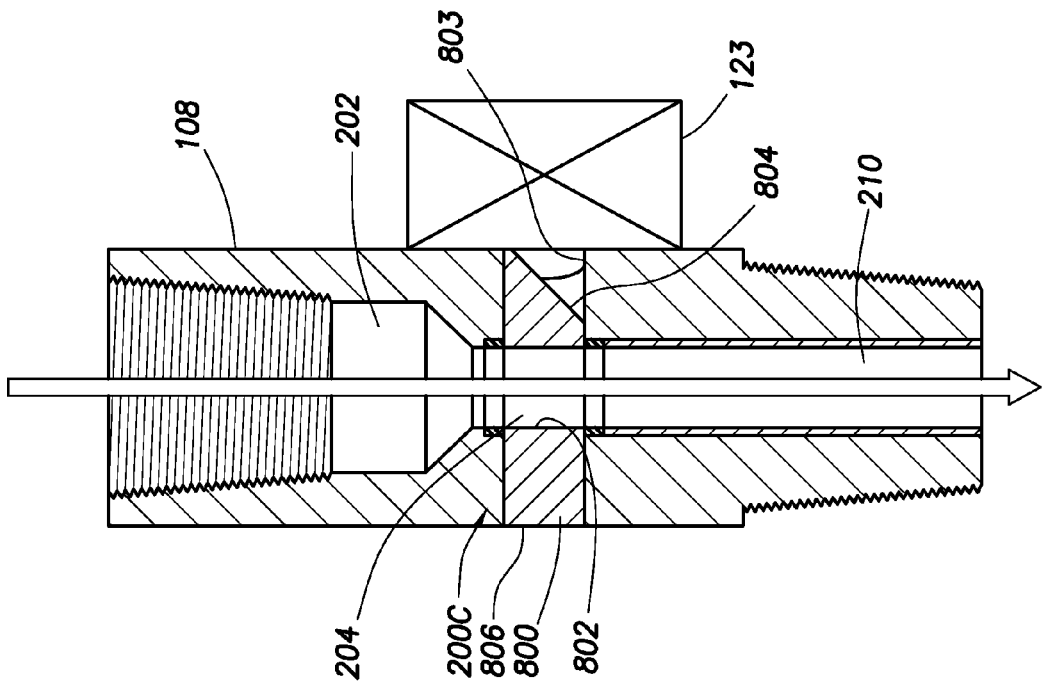
FIGS. 8A-8C are schematic, cross-sectional views depicting the circulation sub having a gate valve for selectively controlling fluid flow.
Figure 8C:
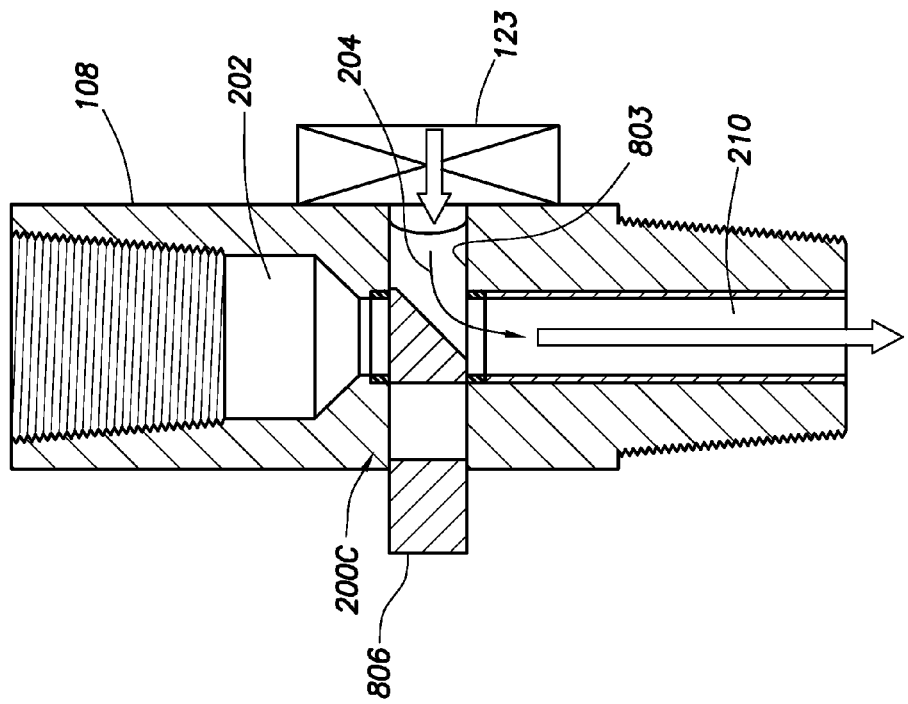
Figure 8B:
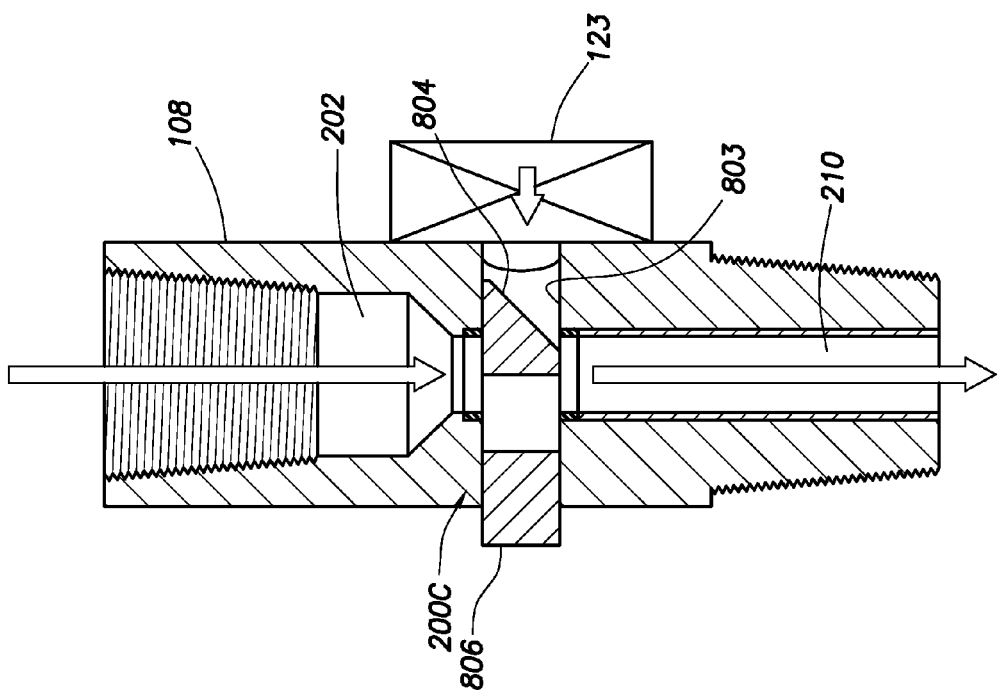

FIGS. 8A-8C depicts the operation of the circulation sub 108 of FIG. 1 wherein the circulation sub 108 has a gate valve 200C for selectively controlling fluid flow. The flow though path 202 and the circulation path 204 shown in FIGS. 8A-8C may be similar to the parts of the ball valve 200A (as shown in FIGS. 2A-2C). The gate valve 200C may have a gate 800 having a gate flow port 802 therethrough. The gate 800 may be moved between the flow through position (as shown in FIG. 8A) and the circulation position (as shown in FIG. 8C). In the flow through position, the gate flow port 802 aligns with the flow through tube 210.

The circulation actuator 123 may engage the circulation sub 108 and pump fluids into a gate port 803. The fluid flowing through the gate port 803 may apply a fluid pressure on a gate actuation surface 804 thereby moving the gate 800 toward the intermediate position (as shown in FIG. 8B) and into the circulation position (as shown in FIG. 8C). The gate actuation surface 804 may have a curved and/or sloped surface for allowing the fluid to flow from the gate port 803 and into the drill string 102 (as shown in FIG. 1) when the gate valve 200C is in the circulation position.

A gate end 806 may be engaged in order to move the gate 800 back to the flow through position. Further, the gate 800 may be motivated toward the flow through position by any motivation means described herein. Although, a portion of the gate 800 is shown as exiting the circulation sub 108 in the circulation position, the circulation sub 108 may completely encompass the gate 800.

Figure 9A:
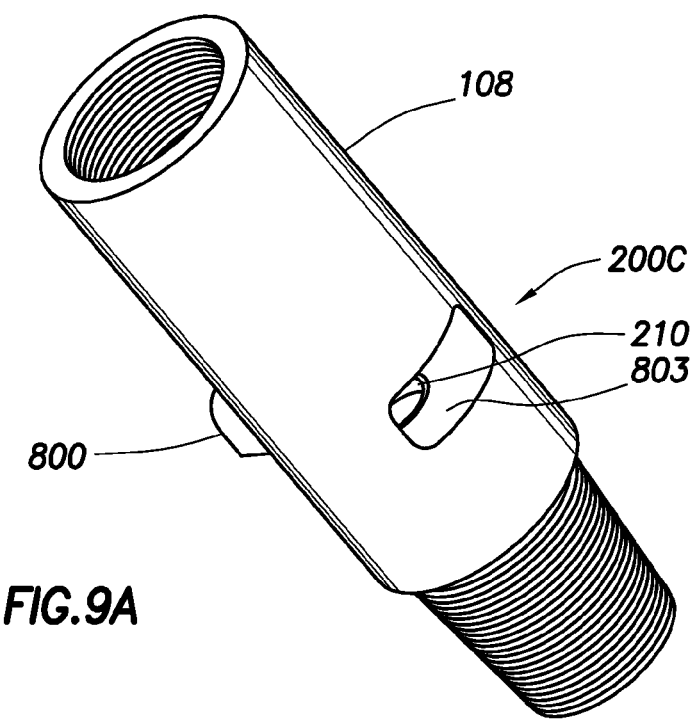
FIGS. 9A and 9B depict schematic views of the circulation sub having the gate valve of FIG. 8C.
Figure 9B:
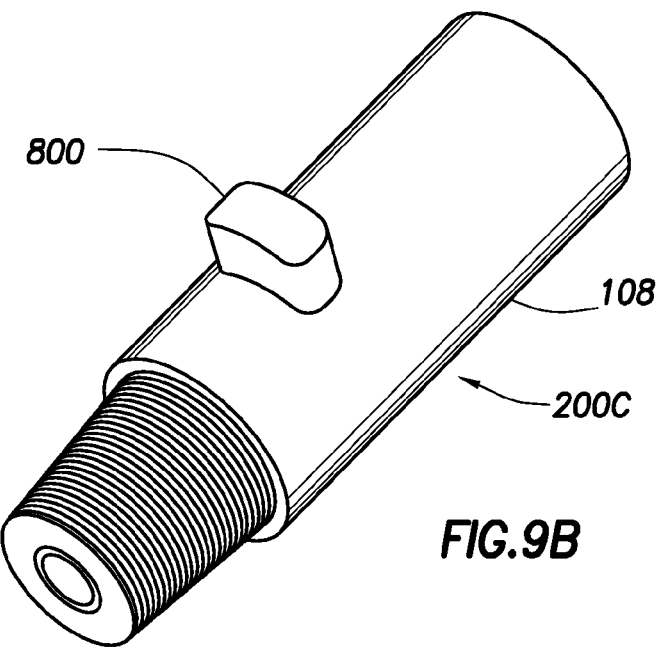

FIGS. 9A and 9B depict schematic views of the circulation sub 108 of FIG. 1 having the gate valve 200C in the circulation position, such as the circulation position of FIG. 8C. FIG. 9A shows the flow through tube 210 as being accessible from the gate port 803 when the gate 800 is in the circulation position. FIG. 9B shows the gate 800 extending from the circulation sub 108 in the circulation position.

Figure 10:
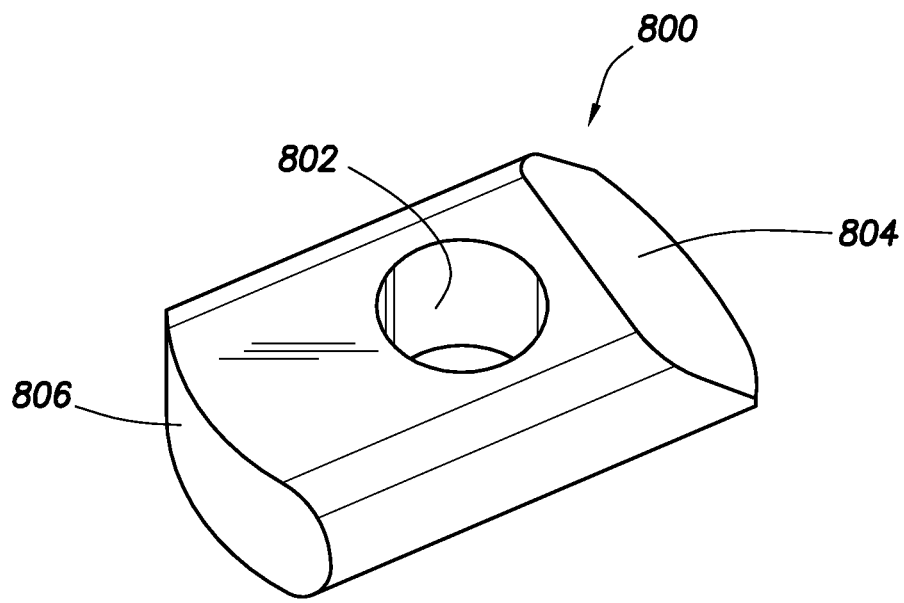
FIG. 10 depicts a perspective view of a gate of the gate valve of FIG. 9A.

FIG. 10 depicts a perspective view of the gate 800. As shown, the gate actuation surface 804 has an angled shape for allowing fluid to flow into the drill string 102 (as shown in FIG. 2) when the gate valve 200C is in the circulation position. The gate end 806 may be curved in order to match the outer surface of the circulation sub 108 (as shown in FIG. 9A). Gate flow port 802 extends through the gate 800 to selectively align with the flow through tube 210 to permit passage of fluid through the sub 108.

Figure 11A:
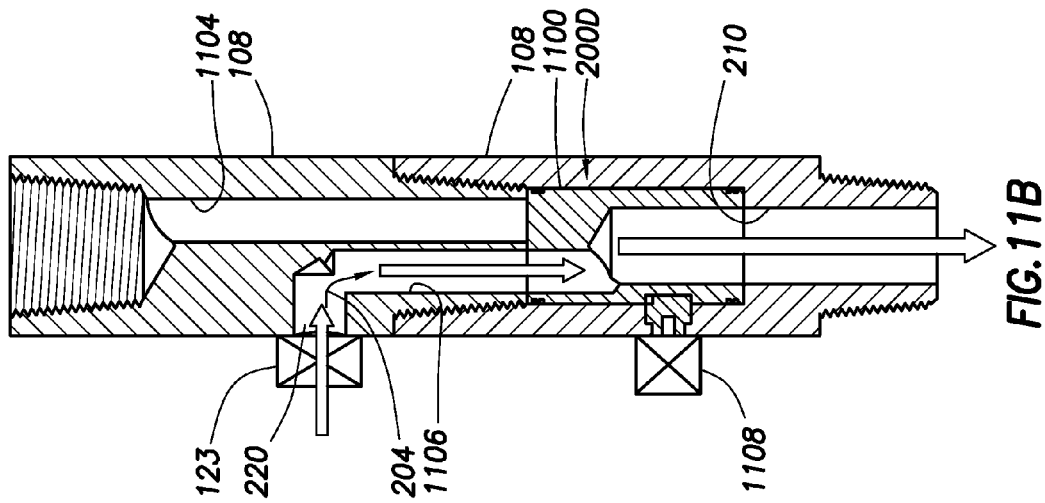
FIGS. 11A and 11B are schematic, cross-sectional views depicting the circulation sub having a rotational valve for selectively controlling fluid flow.
Figure 11B:
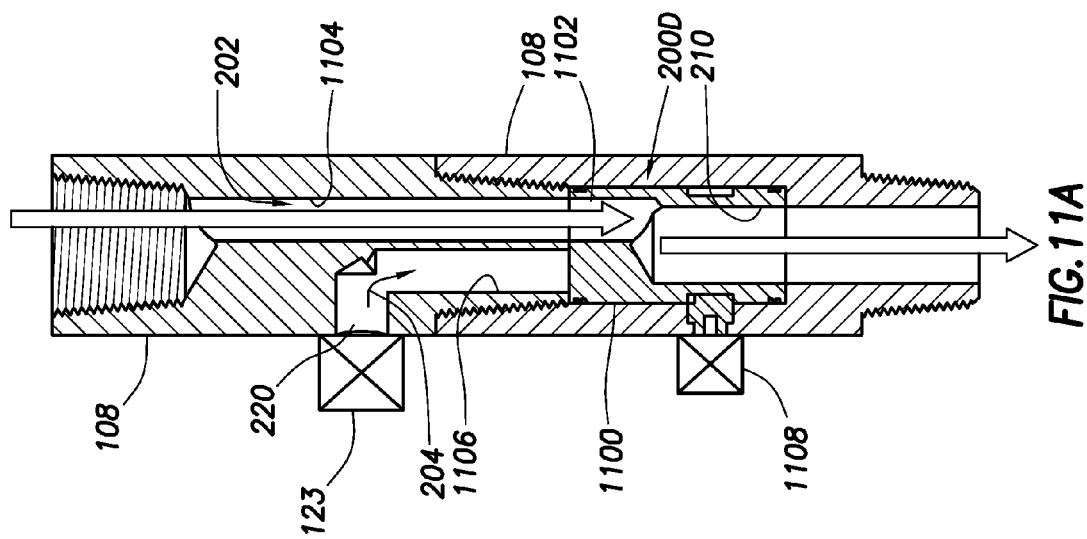

FIGS. 11A and 11B depict the operation of the circulation sub 108 of FIG. 1 wherein the circulation sub 108 has a rotational valve 200D for selectively controlling fluid flow. The flow though path 202 and the circulation path 204 shown in FIGS. 11A and 11B may be similar to the parts of the ball valve 200A (as shown in FIGS. 2A-2C). The rotational valve 200D may be configured to selectively rotate a drum 1100 within the circulation sub 108. The drum 1100 may have an offset flow tube 1102 configured to selectively align with a flow through tube 1104 (as shown in FIG. 11A) and a circulation tube 1106 (as shown in FIG. 11B). Although the circulation tube 1106 is shown as being located above the drum 1100 it may be at any suitable location such as in a side of the drum 1100.

A drum actuator 1108 may rotate the drum 1100 between the flow through position (as shown in FIG. 11A) and the circulation position (as shown in FIG. 11B).

The circulation actuator 123 may engage the port 220 in a similar manner as described herein in order to flow fluids into the drill string 102 (as shown in FIG. 1) when the rotational valve 200D is in the circulation position.

Figure 12:
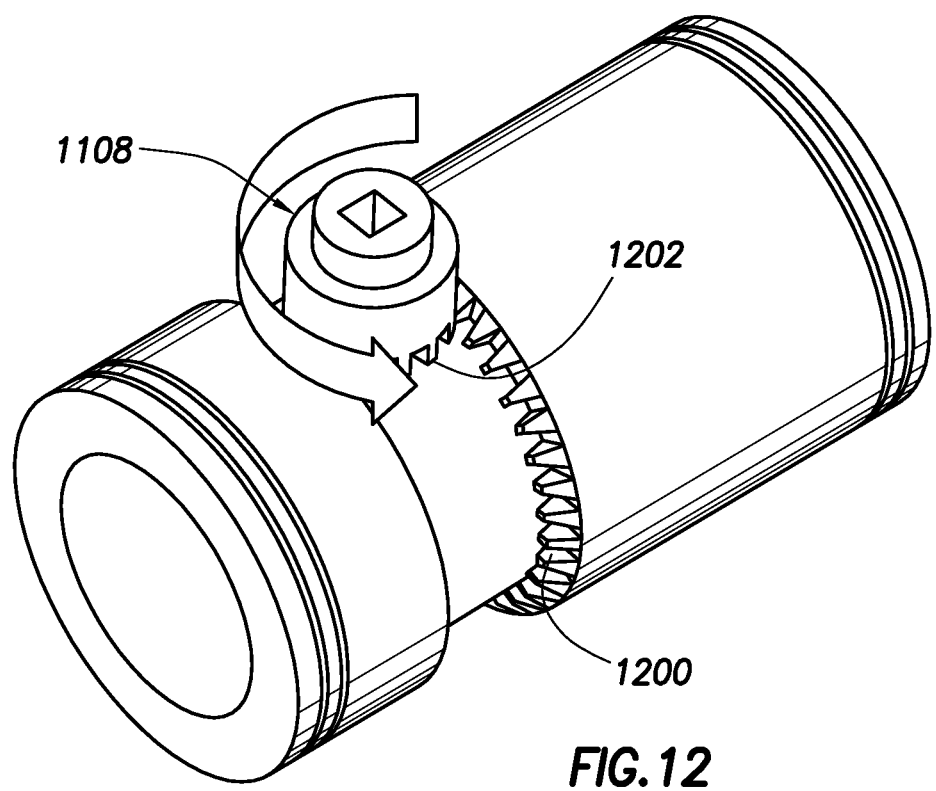
FIG. 12 depicts a schematic perspective view of a drum of FIG. 11A engaged with a drum actuator.

FIG. 12 depicts a schematic perspective view of the drum 1100 of FIG. 11A engaged with the drum actuator 1108. The drum actuator 1108 may have a plurality of actuation gears 1202 for engaging a plurality of drum gears 1200. As the drum actuator 1108 is rotated the plurality of actuation gears 1202 may move the plurality of drum gears 1200 thereby rotating the drum 1100. Although the drum actuator 1108 is shown as a geared device, the drum actuator may be any suitable device for rotating the drum 1100.

Figure 13C:
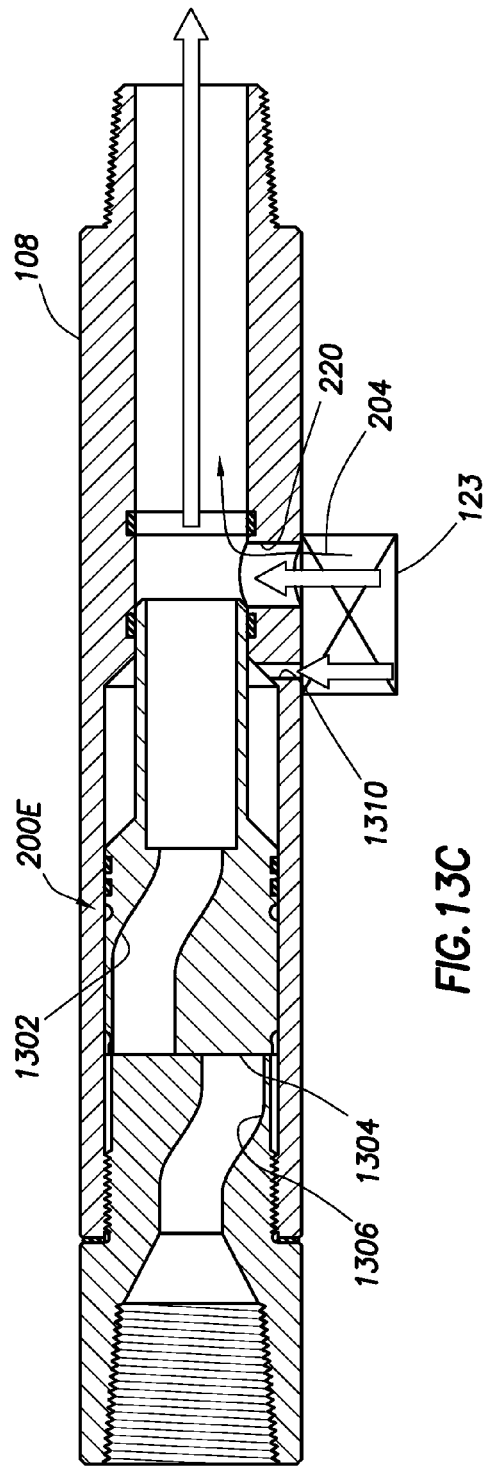

FIGS. 13A-13C depicts the operation of the circulation sub 108 of FIG. 1 wherein the circulation sub 108 has a full bore valve 200E for selectively controlling fluid flow. The flow though path 202 and the circulation path 204 shown in FIGS. 13A-13C may be similar to the parts of the ball valve 200A (as shown in FIGS. 2A-2C). The full bore valve 200E may have a piston 1300 configured to move between the flow through position (as shown in FIG. 13A) and the circulation position (as shown in FIG. 13C).

The piston 1300 may have an offset piston tube 1302 and a piston seal surface 1304. The piston seal surface 1304 may be configured to engage an end of an offset flow through tube 1306 in the circulation position thereby preventing fluid flow from the top drive 119 to the drill string 102 (as shown in FIG. 1). The piston seal surface 1304 may have a gasket seal (not shown) thereon for sealing the piston. In the flow through position, the piston seal surface 1304 may be a distance from the end of the offset flow through tube 1306 creating a flow space 1308 therebetween.

The circulation actuator 123 may have a hydraulic actuator for engaging a hydraulic port 1310. As hydraulic fluid is pumped into the hydraulic port 1310 the piston 1300 is in an intermediate position as it is motivated toward the circulation position (as shown in FIG. 13B). Continued hydraulic pressure on the piston 1300 may move the piston into the circulation position (as shown in FIG. 13C). In the circulation position, the circulation actuator 123 may pump fluids through the port 220 and into the drill string (as shown in FIG. 1) in a similar manner as described above.

Figure 14A:
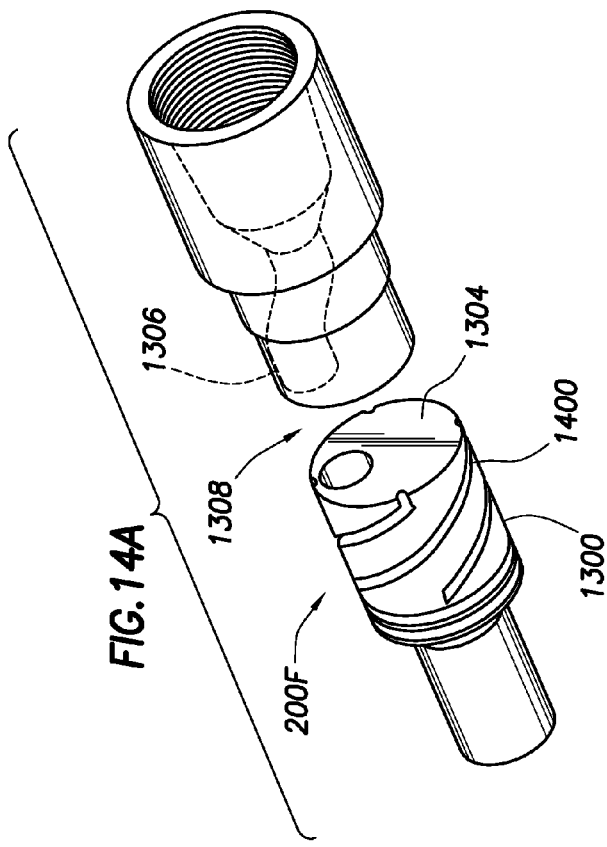
FIGS. 14A-14C are various perspective views depicting the circulation sub having a rotational full bore valve for selectively controlling fluid flow.
Figure 14B:
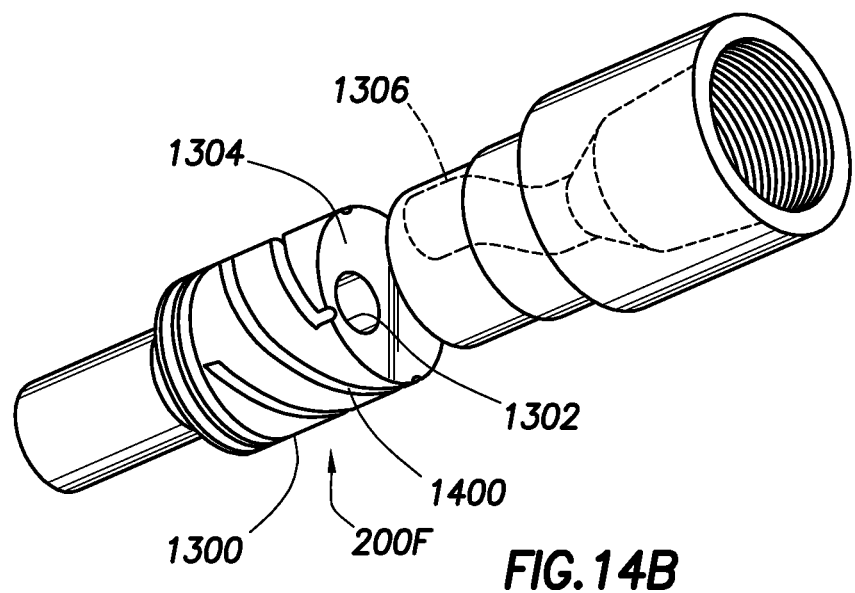
Figure 14C:
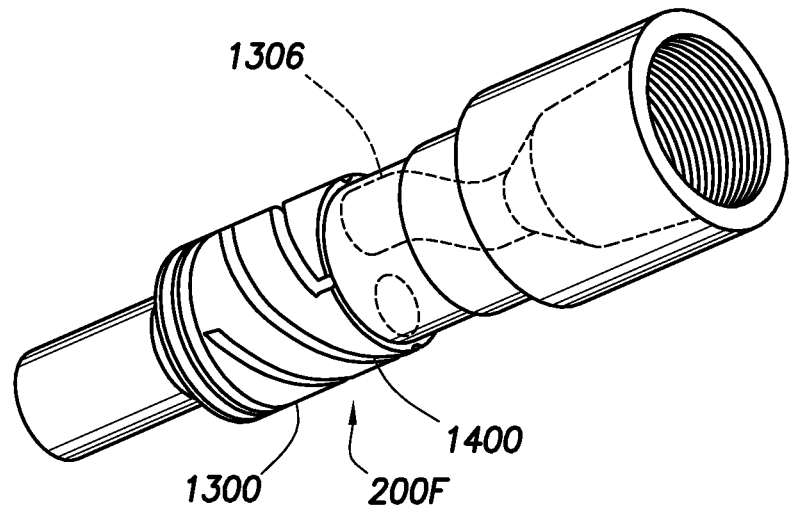

FIGS. 14A-14C depict a rotational full bore valve 200F in flow through, intermediate and circulation positions, respectively, for selectively controlling fluid flow in a circulation sub 108. The piston 1300, the offset piston tube 1302, the piston seal surface 1304, the offset flow through tube 1306, and the flow space 1308 may be similar to the parts of the full bore valve 200E. The piston 1300 may have one or more rotational grooves 1400 for rotating the piston 1300 as the piston 1300 moves between the flow through position (as shown in FIG. 14A) and the circulation position (as shown in FIG. 14C).

Mated fingers (described below) may be positioned on an inner surface of the sub 108 and positionable in the grooves 1400 for allowing the piston 1300 to move along a desired path. The rotation of the piston 1300 may allow the offset piston tube 1302 to linearly align with the offset flow through tube 1306 in the flow through position (FIG. 14A), move to the intermediate position (FIG. 14B), and rotate to engage the piston seal surface 1304 with the end of offset flow through tube 1306 in the circulation position FIG. 14C).

Figure 15A:
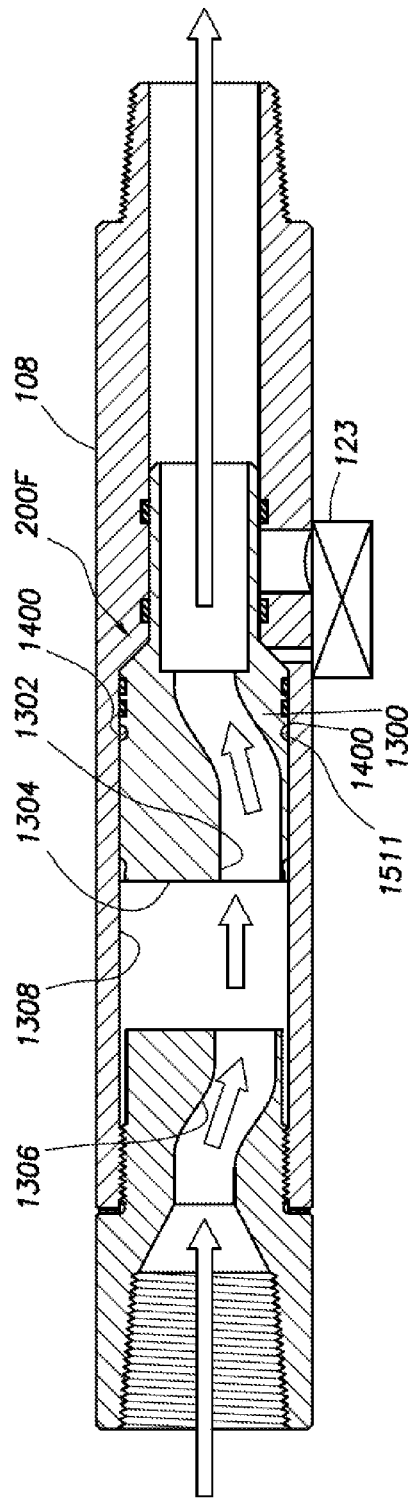
FIGS. 15A-15C are schematic, cross-sectional views depicting the circulation sub having the rotational full bore valve of FIG. 14A in various positions.
Figure 15B:
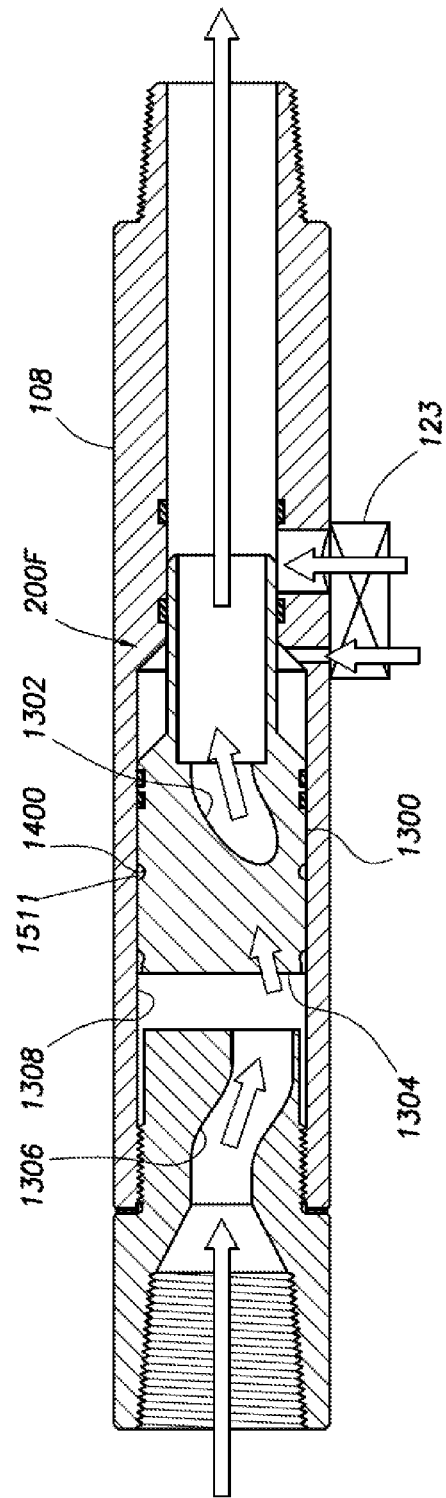
Figure 15C:
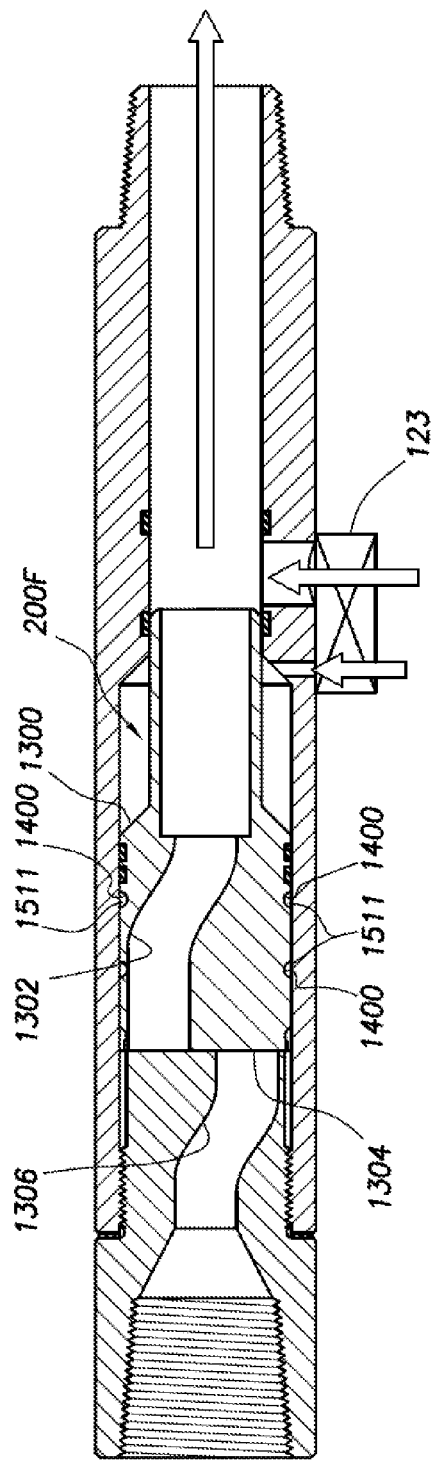

FIGS. 15A-15C depict a cross-sectional view of the circulation sub 108 of FIG. 1 having the rotational full bore valve 200F of FIGS. 14A-14C.

As shown in these figures, sub 108 has fingers 1511 for matingly engaging the grooves 1400 to allow the piston to travel in a desired path therein. FIG. 15A shows the rotational full bore valve 200F in the flow through position. In the flow through position the offset piston tube 1302 is aligned with the offset flow through tube 1306 and has the flow space 1308 between the piston seal surface 1304 and the end of the offset flow through tube 1306.

FIG. 15B shows the piston 1300 in the intermediate position between the flow through position and the circulation position. In the intermediate position, the one or more rotational grooves 1400 have rotated the piston 1300 and thereby the offset piston tube 1302 out of alignment with the offset flow through tube 1306.

FIG. 15C shows the piston 1300 in the circulation position. In the circulation position, the one or more rotational grooves 1400 have rotated the piston 1300 in order to align the piston seal surface 1304 with the end of the offset flow through tube 1306, in a similar manner as described for FIG. 13C. The circulation actuator 123 may actuate the piston 1300 in a similar manner as described for the full bore valve 200E.

Figure 16A:
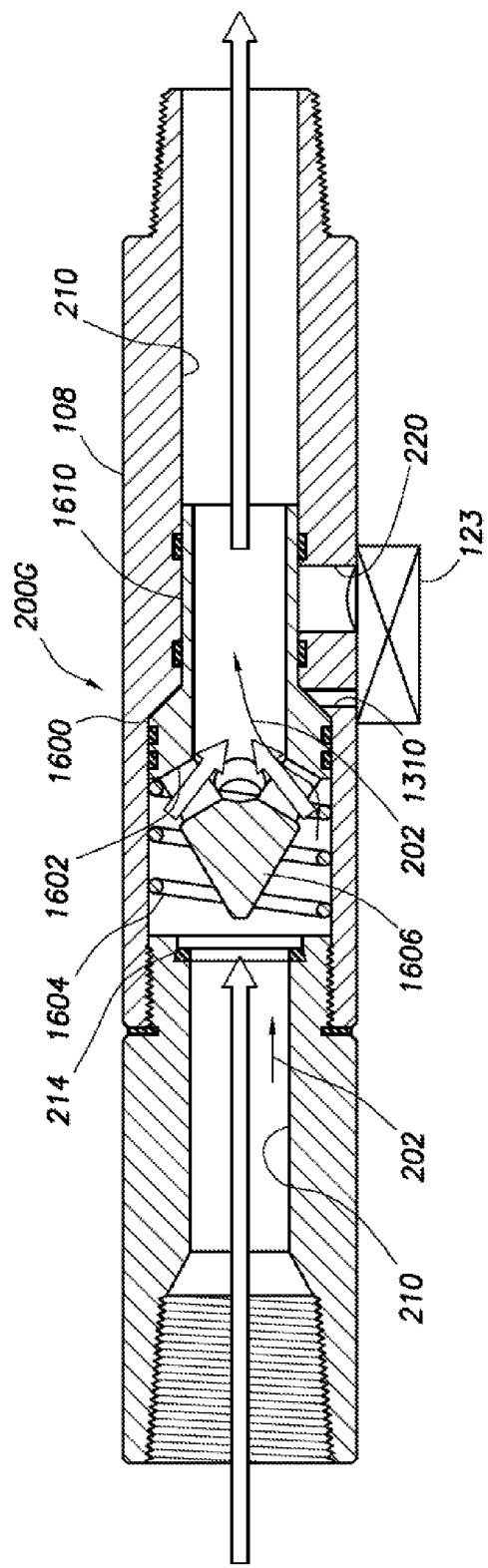
FIGS. 16A and 16B are schematic, cross-sectional views of the circulation sub having of a plunger valve for selectively controlling fluid flow.
Figure 16B:
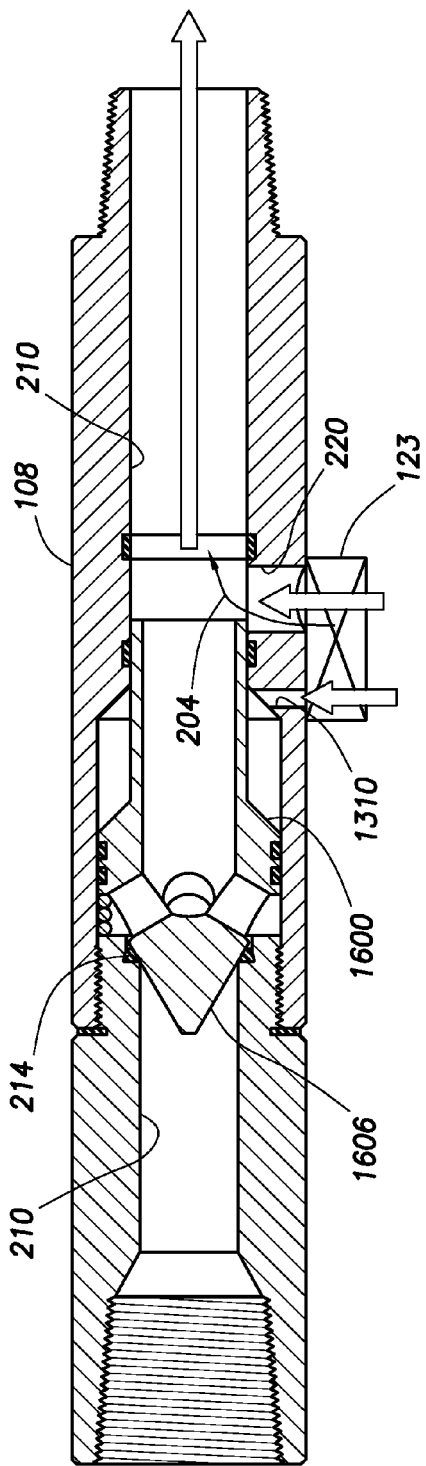

FIGS. 16A and 16B depict cross-sectional views of the circulation sub 108 of FIG. 1 having of a plunger valve 200G for selectively controlling fluid flow. The plunger valve 200G may have a plunger piston 1600 with one or more piston flow paths 1602 therethrough. The plunger piston 1600 may be biased toward the flow through position by a plunger biasing member 1604, shown as a coiled spring. The plunger piston 1600 may be hydraulically forced from the flow through position (as shown in FIG. 16B) into the circulation position (as shown in FIG. 16B) by the circulation actuator 123 supplying hydraulic fluid through the hydraulic port 1310. A plunger seal portion 1606 of the plunger 1600 may engage seal 214 coupled to an end of the upper flow through tube 210 in order to seal off fluid flow through the circulation sub 108.

The plunger piston 1600 may have a port sealing sleeve 1610 configured to seal the port 220 when the plunger piston 1600 is in the flow through position and allow flow through the port 220 when the plunger piston 1600 is in the circulation position. In the flow through position, the fluid may flow from the top drive 119 (as shown in FIG. 1) through the upper flow through port 210 past the one or more piston flow paths 1602 and into the drill string 102 (as shown in FIG. 1). The circulation actuator 123 may then be connected to the hydraulic port 1310 and/or the port 220 in order to move the plunger valve 200G to the circulation position. Hydraulic fluid may be supplied through the hydraulic port 1310 to apply a hydraulic pressure on the plunger piston 1600. The hydraulic pressure may overcome a biasing force of the biasing member 1604 in order to move the plunger piston 1600 to the circulation position. The circulation actuator 123 may then flow fluids through the port 220 and into the drill string 102 (as shown in FIG. 1) in a similar manner as described herein.

Figure 17:
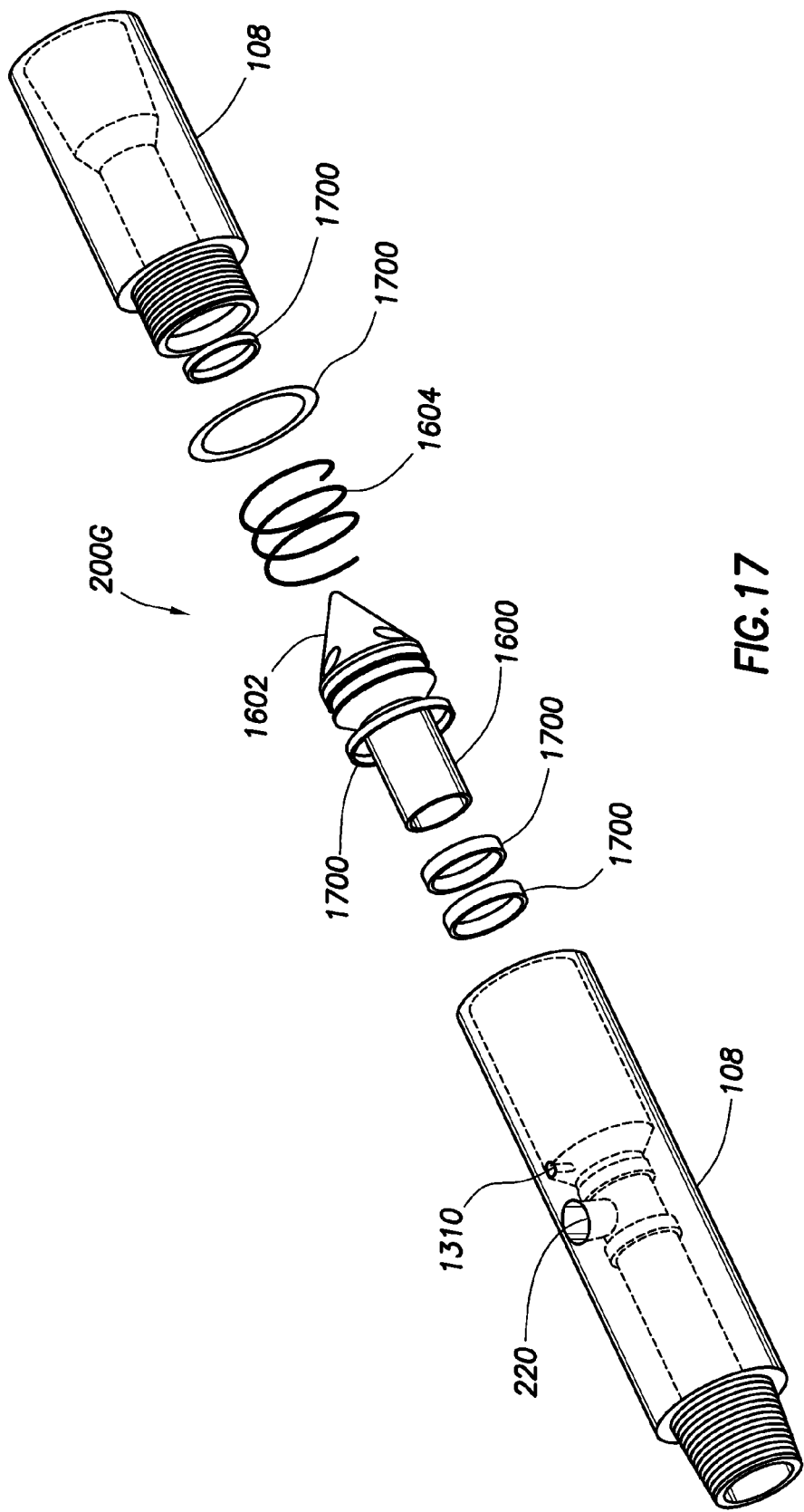
FIG. 17 depicts an exploded view of the circulation sub having the plunger valve of FIG. 16A.

FIG. 17 depicts a perspective, exploded view of the circulation sub 108 having the plunger valve 200G. The plunger valve 200G, or dart valve, may have one or more gaskets 1700 and/or seals for sealing the plunger valve 200G within the circulation sub 108.

Figure 18A:
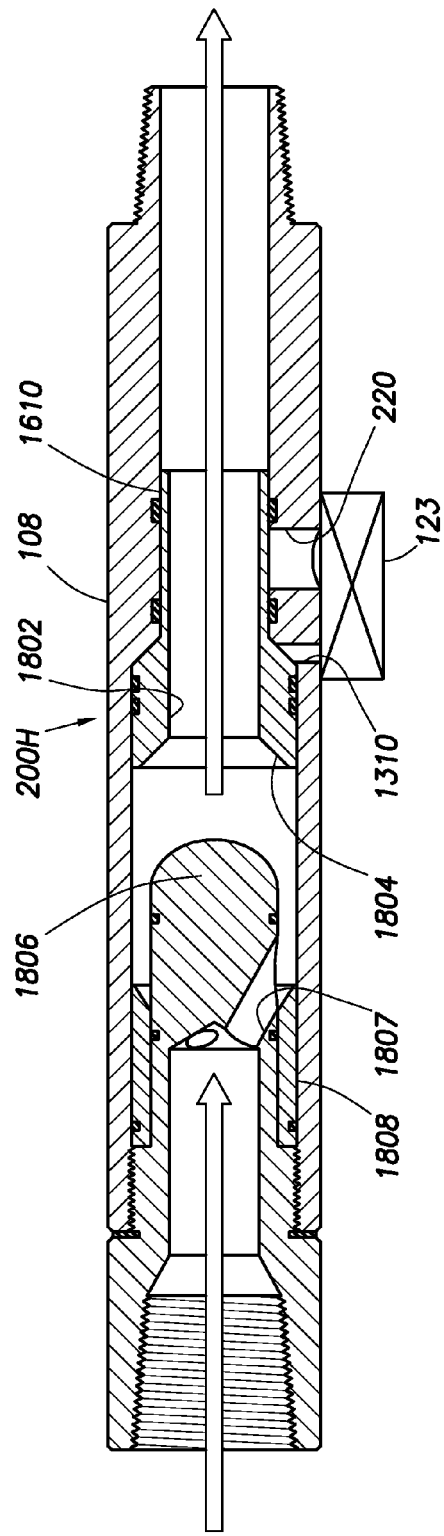

FIGS. 18A-18C depict a cross-sectional view of the circulation sub 108 of FIG. 1 having of a central bore plunger valve 200H for selectively controlling fluid flow. The central bore plunger valve 200H may have a piston 1800 having a central piston flow path 1802 therethrough. The piston 1800 may be configured to move from the flow through position (as shown in FIG. 1) to the circulation position (as shown in FIG. 18C) with hydraulic pressure applied by the circulation actuator 123 in a similar manner as described above. The piston 1800 may have the port sealing sleeve 1610 as described above. An engagement portion 1804 may be configured to move proximate to, or engage with, a piston stop 1806 located in an upper flow through tube 1807. The piston stop 1806 may substantially fill the central piston flow path 1802 when the piston 1800 is engaged with the piston stop 1806.

A sliding sleeve 1808 may be configured to move from a flow through position (as shown in FIG. 18A), to an intermediate position (as shown in FIG. 18B), and to a circulation position (as shown in FIG. 18C). In the flow through position the sliding sleeve 1808 allows fluid flow through the upper flow tube 1807 past the piston stop 1806. A sliding sleeve actuator 1810 may apply hydraulic pressure to the sliding sleeve 1808 in order to move the sliding sleeve 1808 to the circulation position. In the circulation position, the sliding sleeve 1808 may seal the upper flow tube 1807 against the piston stop 1806 thereby preventing fluid flow from the top drive 119 to the drill string 102 (as shown in FIG. 1). In FIG. 18B the port 220 may be open and in fluid communication with the circulation actuator 123 while the flow path from the top drive is still active.

Figure 19:
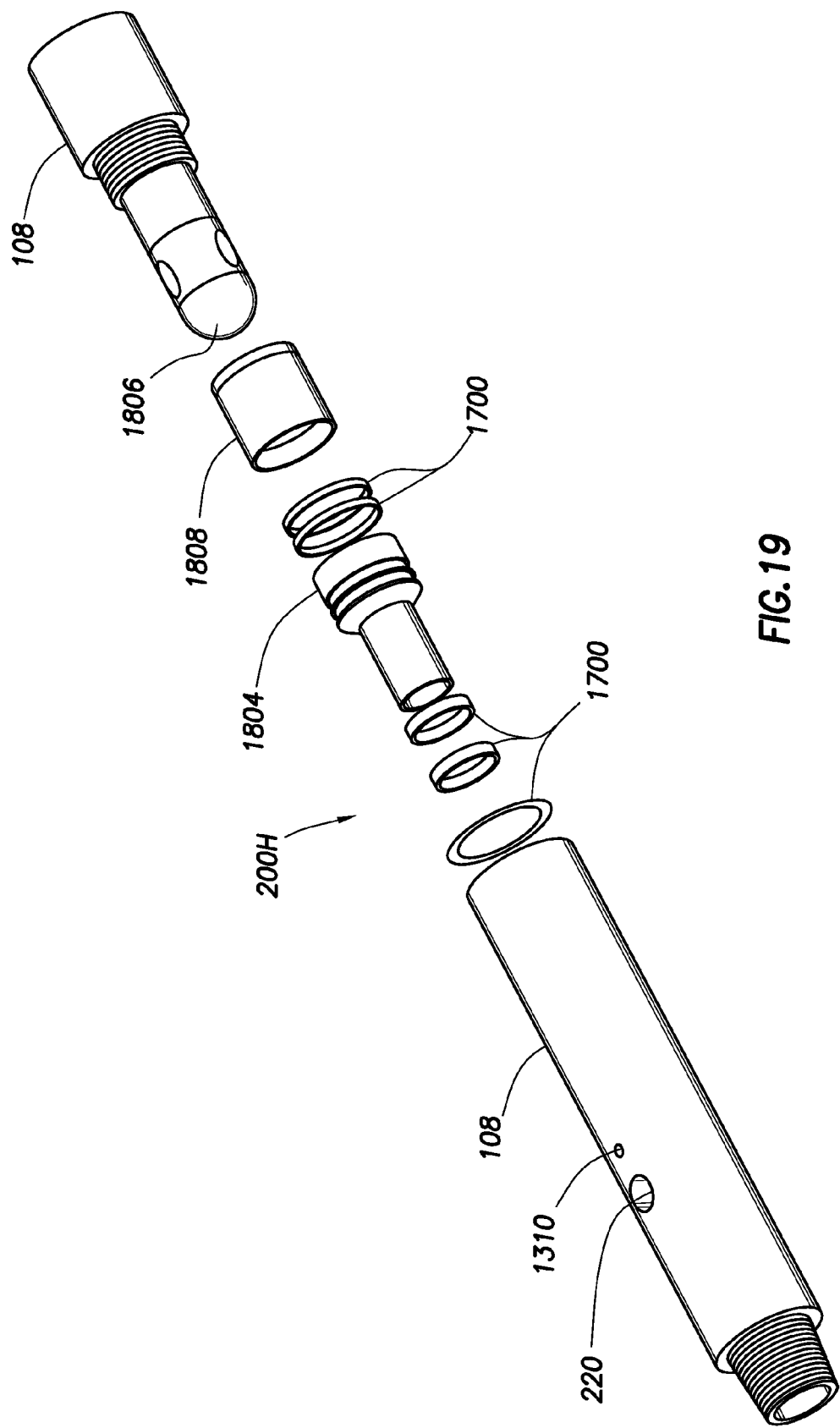
FIG. 19 depicts an exploded view of the circulation sub having the central bore plunger valve of FIG. 18A.

FIG. 19 depicts a perspective exploded view of the circulation sub 108 having the central bore plunger valve 200H. The central bore plunger valve 200H may have one or more gaskets 1700 and/or seals for sealing the central bore plunger valve 200H within the circulation sub 108.

Figure 20C:
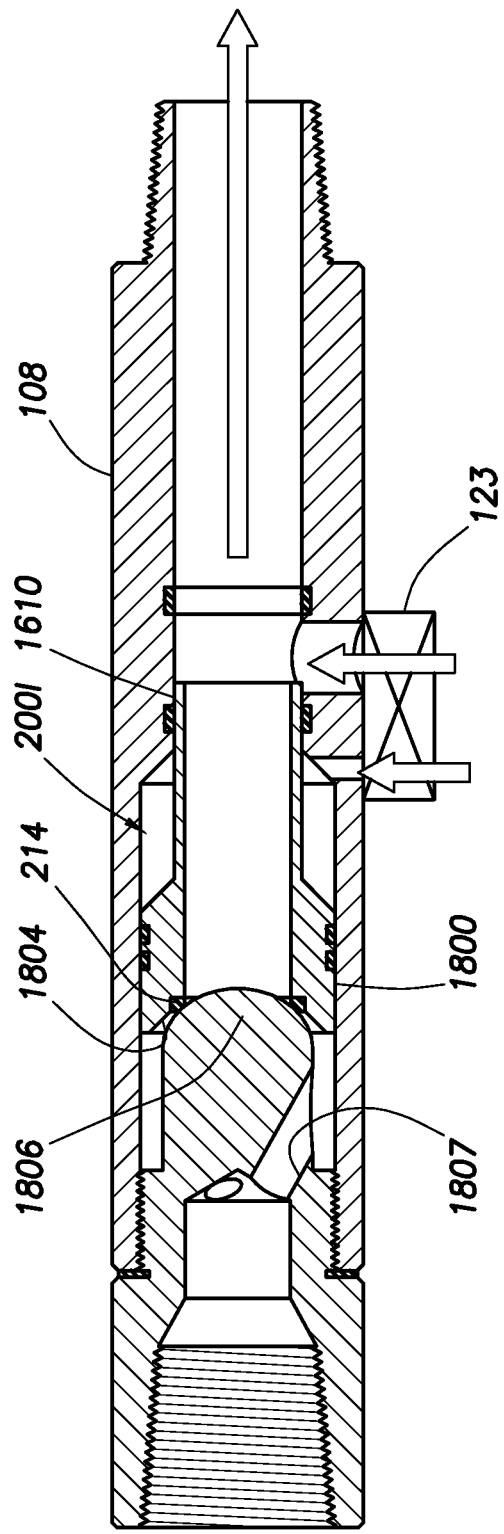

FIGS. 20A-20C depict a cross-sectional view of the circulation sub 108 of FIG. 1 having of a modified central bore plunger valve 200I for selectively controlling fluid flow. The modified central bore plunger valve 200I operates in a similar manner as the central bore plunger valve 200H but does not require the sliding sleeve 1808 (as shown in FIGS. 18A-18C). The engagement portion 1804 of the piston 1800 may have a seal 214 configured to engage the piston stop 1806, and thereby seal the upper flow tube 1807 as shown in FIG. 20C.

Figure 21:
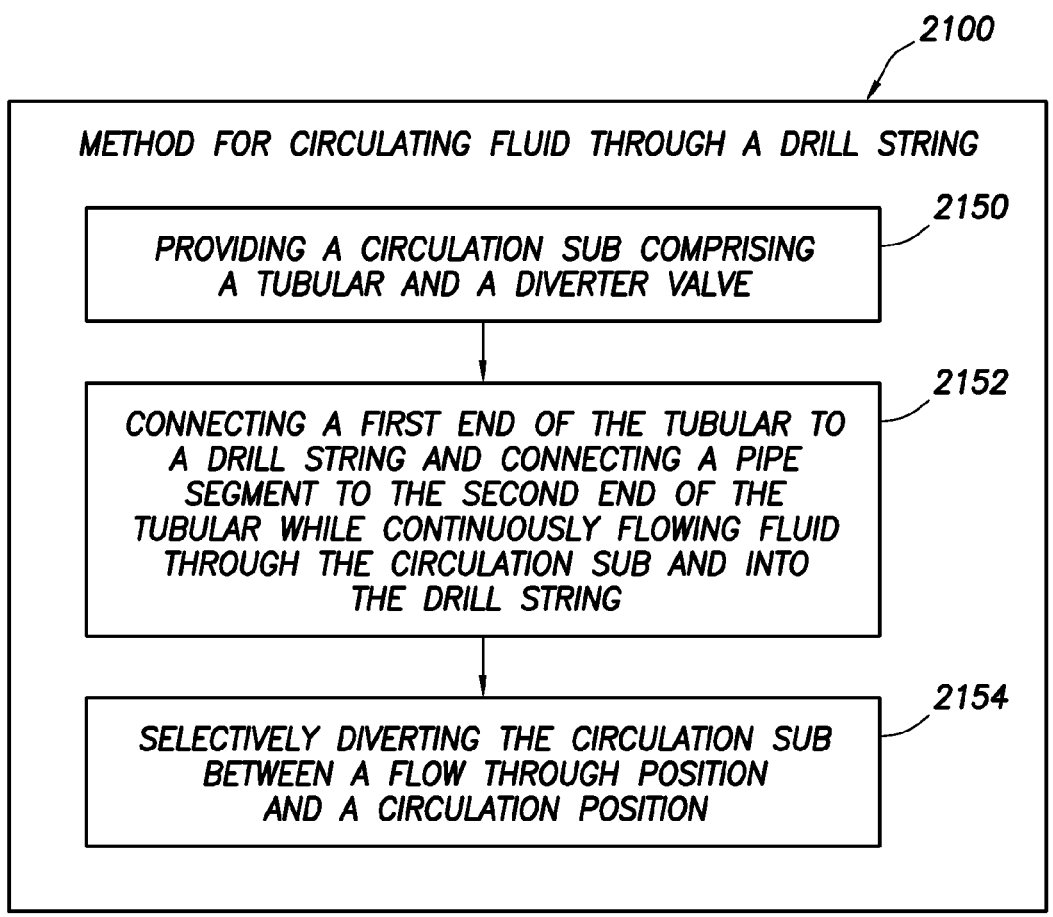
FIG. 21 is a flow chart depicting a method of continuously circulating fluid through a drill string.

FIG. 21 is a flow chart depicting a method (2100) for circulating fluid through a drill string. The method involves providing (2150) a circulation sub including a tubular with a fluid path and a circulation path, and having a first end and a second end and a port therein. The method further involves connecting (2152) a first end of the tubular to the drill string and connecting a pipe segment to the second end of the tubular while continuously flowing fluid through the circulation sub and into the drill string, and selectively (2154) diverting the circulation sub between an flow through position and a circulation position.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

Aspects of the invention may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, one or more circulation subs may be used with one or more valves in a given drill string.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A circulation sub for continuously circulating a fluid into a drill string, the drill string positionable in a wellbore penetrating a subterranean formation, the circulation sub comprising:
   a tubular having a first end connectable to the drill string and a second end connectable to a pipe segment, the tubular having a port therein, the tubular having a fluid path for allowing the fluid to flow from the pipe segment to the drill string and a circulation path for allowing the fluid to flow from the port to the drill string; and
   a diverter valve having a channel therethrough in selective fluid communication with the fluid path, the diverter valve positionable between a flow through position for selectively allowing the fluid to flow through the fluid path and a diversion position for selectively allowing the fluid to flow through the circulation path, the diverter valve comprising:
   a sleeve rotatable about an axis of the tubular to selectively block the port and a ball seatable in a neck of the tubular to selectively block the fluid path whereby the fluid may continuously flow through the drill string, the ball unseating from the neck to open the fluid path.

2. The circulation sub of claim 1, wherein the diverter valve comprises a ball valve selectively positionable in the fluid path and the circulation path.

3. The circulation sub of claim 2, wherein the diverter valve further comprises a port sleeve for selectively sealing off the port.

4. The circulation sub of claim 2, wherein the diverter valve further comprises a flow through tube positionable in the tubular, the flow through tube having the channel therethrough.

5. The circulation sub of claim 4, wherein the flow through tube has the fluid path and the circulation path therethrough.

6. The circulation sub of claim 5, wherein at least a portion of the flow through tube has a circular cross section.

7. The circulation sub of claim 4, wherein the sleeve is rotationally positionable about the tubular for selectively blocking the port.

8. The circulation sub of claim 7, further comprising a sleeve lock.

9. The circulation sub of claim 1, further comprising at least one gasket.

10. The circulation sub of claim 1, wherein the fluid path is parallel to the axis of the tubular, and the circulation path is at an angle to the axis of the tubular.

11. The circulation sub of claim 10, wherein the angle is ninety degrees.

12. The circulation sub of claim 1, wherein the sleeve is positioned about an outer surface of the tubular.

13. The circulation sub of claim 1, wherein the tubular has a groove along an outer surface shaped to receive the sleeve.

14. The circulation sub of claim 1, wherein the sleeve comprises a sleeve aperture selectively alignable with the port of the tubular.

15. The circulation sub of claim 1, wherein the sleeve further comprises a lock.

16. The circulation sub of claim 15, wherein the lock comprises at least one locking pin engagable with a lock port in the sleeve.

17. The circulation sub of claim 16, wherein the at least one locking pin retractably extends outwards from the tubular.

18. The circulation sub of claim 16, wherein the at least one locking pin is biased towards the locked position.

19. The circulation sub of claim 1, wherein the neck comprises a ball seal.

20. The circulation sub of claim 19, wherein the ball seal is positioned on the surface of the neck within the tubular between the neck and the fluid path.

21. The circulation sub of claim 1, wherein the neck is sized to selectively prevent the ball from passing therethrough.

22. The circulation sub of claim 1, wherein the port and an inner diameter of the are large enough to permit passage of the ball.

23. The circulation sub of claim 1, further comprising a curved path within the tubular extending from the port to the neck.

24. The circulation sub of claim 1, wherein the port is shaped to receive the ball therethrough.

25. A circulation system for continuously circulating a fluid into a drill string, the drill string positionable in a wellbore penetrating a subterranean formation, the circulation system comprising:
   a circulation sub, comprising:
      a tubular having a first end connectable to the drill string and a second end connectable to a pipe segment, the tubular having a port therein, the tubular having a fluid path for allowing the fluid to flow from the pipe segment to the drill string and a circulation path for allowing the fluid to flow from the port to the drill string; and
      a diverter valve having a channel therethrough in selective fluid communication with the fluid path, the diverter valve positionable between a flow through position for selectively allowing the fluid to flow through the fluid path and a diversion position for selectively allowing the fluid to flow through the circulation path, the diverter valve comprising:
         a sleeve rotatable about an axis of the tubular to selectively block the port and a ball seatable in a neck of the tubular to selectively block the fluid path whereby the fluid may continuously flow through the drill string, the ball unseating from the neck to open the fluid path; and
   a surface system for coupling the circulation sub to the drill string and for coupling the pipe segment to the circulation sub; and
   a fluid source for allowing the fluid to flow through the circulation sub.

26. The circulation system of claim 25, further comprising an actuator for selectively activating the diverter valve.

27. The circulation system of claim 25, wherein the fluid source is in selective fluid communication with the first end of the tubular and the port for selectively allowing the fluid to flow therein.

28. A method for continuously circulating a fluid into a drill string, the drill string positionable in a wellbore penetrating a subterranean formation, the method comprising:
   providing a circulation sub, comprising:
      a tubular having a first end connectable to the drill string and a second end connectable to a pipe segment, the tubular having a port therein, the tubular having a fluid path for allowing the fluid to flow from the pipe segment to the drill string and a circulation path for allowing the fluid to flow from the port to the drill string; and
      a diverter valve having a channel therethrough in selective fluid communication with the fluid path, the diverter valve positionable between a flow through position for selectively allowing the fluid to flow through the fluid path and a diversion position for selectively allowing the fluid to flow through the circulation path, the diverter valve comprising:
         a sleeve rotatable about an axis of the tubular to selectively block the port and a ball seatable in a neck of the tubular to selectively block the fluid path, the ball unseating from the neck to open the fluid path: and
   connecting the first end of the tubular to the drill string and connecting the pipe segment to the second end of the tubular while continuously flowing the fluid through the circulation sub and into the drill string.

29. The method of claim 28, further comprising selectively diverting the circulation sub between the flow through position and the circulation position.

30. The method of claim 28, further comprising selectively allowing the fluid to flow into the first end of the tubular and into the port.

* * * * *